(12) United States Patent
Figiel

(10) Patent No.: US 10,370,795 B2
(45) Date of Patent: *Aug. 6, 2019

(54) MONITORING APPLICATOR RODS AND APPLICATOR ROD NIPS

(71) Applicant: INTERNATIONAL PAPER COMPANY, Memphis, TN (US)

(72) Inventor: Kerry D. Figiel, Cincinnati, OH (US)

(73) Assignee: INTERNATIONAL PAPER COMPANY, Memphis, TN (US)

(*) Notice: Subject to any disclaimer, the term of this patent is extended or adjusted under 35 U.S.C. 154(b) by 919 days.

This patent is subject to a terminal disclaimer.

(21) Appl. No.: 14/736,060

(22) Filed: Jun. 10, 2015

(65) Prior Publication Data
US 2016/0362840 A1    Dec. 15, 2016

(51) Int. Cl.
*B65H 5/06* (2006.01)
*D21F 3/06* (2006.01)
(Continued)

(52) U.S. Cl.
CPC ............... *D21F 3/06* (2013.01); *B65H 5/064* (2013.01); *B65H 7/02* (2013.01); *D21G 9/0045* (2013.01); *D21H 23/56* (2013.01); *D21H 23/78* (2013.01); *G01L 5/0076* (2013.01); *G01L 5/0085* (2013.01); *B65H 2553/51* (2013.01)

(58) Field of Classification Search
CPC ...... B65H 7/02; B65H 5/064; B65H 2553/51; D21F 3/06; G01L 5/0085; B41M 5/52
See application file for complete search history.

(56) References Cited

U.S. PATENT DOCUMENTS

| 757,221 A | 4/1904 | Partridge |
| 2,300,909 A | 11/1942 | Broughton |

(Continued)

FOREIGN PATENT DOCUMENTS

| CA | 2947591 | 11/2015 |
| CN | 1782223 A | 6/2006 |

(Continued)

OTHER PUBLICATIONS

Sasaki et al., In-Roll Stress Analysis Considering Air-Entrainment at the Roll-Inlet with the Effect of Grooves on Nip Roll Surface, 2008, pp. 133-145, vol. 2, No. 1, Journal of Advanced Mechanical Design, Systems, and Manufacturing.

*Primary Examiner* — Jeremy R Severson
(74) *Attorney, Agent, or Firm* — Thomas W. Barnes, III

(57) ABSTRACT

A sensor signal is generated from a plurality of sensors located on a sensing roll, wherein each sensor enters a nip between the sensing roll and a rotating component during each rotation of the sensing roll. A rotating applicator rod forms forming a second nip with the sensing roll such that each sensor enters the second nip during each rotation of the sensing roll and each sensor generates a sensor signal upon entering the second nip. A periodically occurring starting reference is generated associated with each rotation of the applicator rod and the signal generated by each sensor is received so that a particular one of the sensors which generated the signal is determined and one of a plurality of tracking segments is identified. The signal is stored to associate the sensor signal with the identified one tracking segment.

28 Claims, 20 Drawing Sheets

(51) Int. Cl.
*D21G 9/00* (2006.01)
*G01L 5/00* (2006.01)
*B65H 7/02* (2006.01)
*D21H 23/56* (2006.01)
*D21H 23/78* (2006.01)

(56) References Cited

U.S. PATENT DOCUMENTS

| | | |
|---|---|---|
| 3,622,448 A | 11/1971 | Adams et al. |
| 3,673,865 A | 7/1972 | Michaelsen |
| 3,794,427 A | 2/1974 | Shibata et al. |
| 3,840,302 A | 10/1974 | Brunton et al. |
| 3,863,453 A | 2/1975 | Mercier |
| 3,936,665 A | 2/1976 | Donoghue |
| 3,989,085 A | 11/1976 | Crosby |
| 4,019,066 A | 4/1977 | Lucas et al. |
| 4,059,794 A | 11/1977 | Furness et al. |
| 4,074,624 A | 2/1978 | Biornstad et al. |
| 4,090,205 A | 5/1978 | Huffman et al. |
| 4,092,068 A | 5/1978 | Lucas et al. |
| 4,152,202 A | 5/1979 | DeLigt |
| 4,233,011 A | 11/1980 | Bolender et al. |
| 4,423,636 A | 1/1984 | Plante |
| 4,495,587 A | 1/1985 | Plante et al. |
| 4,509,237 A | 4/1985 | Volz et al. |
| 4,524,546 A | 6/1985 | Hoover et al. |
| 4,729,153 A | 3/1988 | Pav et al. |
| 4,879,471 A | 11/1989 | Dahlquist |
| 4,898,012 A | 2/1990 | Jones et al. |
| 4,903,528 A | 2/1990 | Balakrishnan et al. |
| 4,921,574 A | 5/1990 | Hu |
| 4,947,684 A | 8/1990 | Balakrishnan |
| 5,022,966 A | 6/1991 | Hu |
| 5,048,353 A | 9/1991 | Justus |
| 5,121,332 A | 6/1992 | Balakrishnan et al. |
| 5,122,963 A | 6/1992 | Chen |
| 5,125,746 A | 6/1992 | Lipshitz |
| 5,250,348 A | 10/1993 | Knauf |
| 5,358,606 A | 10/1994 | Makkonen |
| 5,379,652 A | 1/1995 | Allonen |
| 5,383,371 A | 1/1995 | Laitinen |
| 5,400,258 A | 3/1995 | He |
| 5,562,027 A | 10/1996 | Moore |
| 5,563,809 A | 10/1996 | Williams et al. |
| 5,592,875 A | 1/1997 | Moschel |
| 5,699,729 A | 12/1997 | Moschel |
| 5,725,737 A | 3/1998 | Pikulik et al. |
| 5,743,177 A | 4/1998 | Wostbrock |
| 5,745,365 A | 4/1998 | Parker |
| 5,960,374 A | 9/1999 | Lausier |
| 6,152,720 A | 11/2000 | Greb et al. |
| 6,336,078 B1 | 1/2002 | Sakayori et al. |
| 6,356,846 B1 | 3/2002 | Habeger, Jr. et al. |
| 6,370,961 B1 | 4/2002 | Trantzas et al. |
| 6,411,860 B1 | 6/2002 | Chen |
| 6,482,339 B1 | 11/2002 | Greb et al. |
| 6,519,552 B1 | 2/2003 | Sampath et al. |
| 6,567,720 B1 | 5/2003 | Figiel |
| 6,568,285 B1 | 5/2003 | Moore et al. |
| 6,769,314 B2 | 8/2004 | Moore |
| 6,805,899 B2 | 10/2004 | MacHattie et al. |
| 6,849,851 B2 | 2/2005 | Komulainen et al. |
| 6,925,279 B2 | 8/2005 | Kamoshita |
| 6,934,028 B2 | 8/2005 | Ho et al. |
| 6,950,777 B1 | 9/2005 | Lilburn et al. |
| 7,018,708 B2 | 3/2006 | Song et al. |
| 7,127,315 B2 | 10/2006 | Junge et al. |
| 7,155,356 B2 | 12/2006 | Mantyla et al. |
| 7,185,537 B2 | 3/2007 | Muhs |
| 7,225,688 B2 | 6/2007 | Moore et al. |
| 7,261,680 B2 | 8/2007 | Lutz |
| 7,294,234 B2 | 11/2007 | Munch et al. |
| 7,305,894 B2 | 12/2007 | Moore et al. |
| 7,392,715 B2 | 7/2008 | Moore et al. |
| 7,406,876 B2 | 8/2008 | Krozer |
| 7,430,887 B2 | 10/2008 | Mucke et al. |
| 7,444,862 B2 | 11/2008 | Innala et al. |
| 7,581,456 B2 | 9/2009 | Moore et al. |
| 7,582,188 B2 | 9/2009 | Stoffel et al. |
| 7,608,166 B2 | 10/2009 | Huang et al. |
| 7,608,338 B2 | 10/2009 | Song et al. |
| 7,629,799 B2 | 12/2009 | Murphy |
| 7,736,466 B2 | 6/2010 | Singh et al. |
| 7,745,525 B2 | 6/2010 | Koenig |
| 7,815,770 B2 | 10/2010 | Huang et al. |
| 7,828,935 B2 | 11/2010 | Huang et al. |
| 7,963,180 B2 | 6/2011 | Moore et al. |
| 7,967,953 B2 | 6/2011 | Singh et al. |
| 8,007,920 B2 | 8/2011 | Song et al. |
| 8,012,551 B2 | 9/2011 | Song et al. |
| 8,123,907 B2 | 2/2012 | Stoffel et al. |
| 8,236,141 B2 | 8/2012 | Pak |
| 8,292,295 B2 | 10/2012 | Ohshima et al. |
| 8,361,573 B2 | 1/2013 | Koenig |
| 8,372,243 B2 | 2/2013 | Singh et al. |
| 8,382,946 B2 | 2/2013 | Song et al. |
| 8,440,053 B2 | 5/2013 | Koenig et al. |
| 8,474,333 B2 | 7/2013 | Berendes |
| 8,475,347 B2 | 7/2013 | Gustafson et al. |
| 8,486,229 B2 | 7/2013 | Pietikainen et al. |
| 8,540,241 B2 | 9/2013 | Sugahara |
| 8,574,690 B2 | 11/2013 | Koenig et al. |
| 8,586,156 B2 | 11/2013 | Koenig et al. |
| 8,586,279 B2 | 11/2013 | Williams et al. |
| 8,586,280 B2 | 11/2013 | Williams et al. |
| 8,608,908 B2 | 12/2013 | Koenig et al. |
| 8,652,593 B2 | 2/2014 | Koenig |
| 8,652,594 B2 | 2/2014 | Koenig et al. |
| 8,697,203 B2 | 4/2014 | Koenig |
| 8,758,565 B2 | 6/2014 | Singh et al. |
| 8,758,886 B2 | 6/2014 | Koenig et al. |
| 8,795,796 B2 | 8/2014 | Koenig |
| 9,097,595 B2 | 8/2015 | Moore |
| 9,121,686 B2 | 9/2015 | Gustafson |
| 9,557,170 B2 | 1/2017 | Cantrell |
| 9,677,225 B2 * | 6/2017 | Figiel ................. D21F 3/06 |
| 9,804,044 B2 | 10/2017 | Figiel |
| 2004/0237665 A1 | 12/2004 | Mucke et al. |
| 2005/0208878 A1 | 9/2005 | Weiss |
| 2006/0020418 A1 | 1/2006 | Moore et al. |
| 2006/0090574 A1 | 5/2006 | Moore et al. |
| 2006/0248723 A1 | 11/2006 | Gustafson |
| 2007/0006644 A1 | 1/2007 | Schultheis |
| 2008/0087073 A1 | 4/2008 | Ulfert et al. |
| 2010/0071480 A1 | 3/2010 | Pietikainen et al. |
| 2010/0125428 A1 | 5/2010 | Moore |
| 2011/0020532 A1 | 1/2011 | Lannes |
| 2011/0301003 A1 | 12/2011 | Gustafson et al. |
| 2012/0310596 A1 | 12/2012 | Gustafson et al. |
| 2013/0185015 A1 | 7/2013 | Cantrell |
| 2014/0257719 A1 | 9/2014 | Figiel |
| 2014/0352882 A1 | 12/2014 | Nash et al. |
| 2015/0316429 A1 | 11/2015 | Figiel |
| 2015/0316430 A1 | 11/2015 | Figiel |
| 2015/0316432 A1 | 11/2015 | Figiel |
| 2016/0038969 A1 | 2/2016 | Schmitt |

FOREIGN PATENT DOCUMENTS

| | | |
|---|---|---|
| CN | 1989294 A | 6/2007 |
| CN | 101395456 A | 3/2009 |
| CN | 102345242 A | 2/2012 |
| CN | 102971085 A | 3/2013 |
| CN | 103635629 A | 3/2014 |
| CN | 105209875 A | 12/2015 |
| CN | 107690497 A | 2/2018 |
| CN | 107709660 A | 2/2018 |
| DE | 19910197 C1 | 10/2000 |
| EP | 1653207 | 5/2006 |
| EP | 2641857 | 12/2015 |
| RU | 2285903 | 10/2006 |
| SU | 1049600 A1 | 10/1983 |
| WO | 9113337 | 9/1991 |
| WO | WO-1991/13337 A1 | 9/1991 |

(56) References Cited

FOREIGN PATENT DOCUMENTS

| WO | 9625288 | 8/1996 |
| WO | 2005113891 | 12/2005 |
| WO | WO-2008/155461 | 12/2008 |
| WO | WO-2009/092761 | 7/2009 |
| WO | WO-2009/092761 A2 | 7/2009 |
| WO | 2011107660 | 9/2011 |
| WO | WO-2012/113747 A1 | 8/2012 |
| WO | WO-2012/166835 A1 | 12/2012 |
| WO | WO-2014177434 A1 | 11/2014 |
| WO | WO-2015/168492 A1 | 11/2015 |

\* cited by examiner

| Sensor Reading (402) | Pressure Reading (404) | Circumferential Segment Number (406) |
|---|---|---|
| 1 | 0 | 1 |
| 2 | 2.253860455 | 2 |
| 3 | 4.32512654 | 3 |
| 4 | 6.045996595 | 4 |
| 5 | 7.277055963 | 5 |
| 6 | 7.918571535 | 6 |
| 7 | 7.918571535 | 7 |
| 8 | 7.277055963 | 8 |
| 9 | 6.045996595 | 9 |
| 10 | 4.32512654 | 10 |
| 11 | 2.253860455 | 11 |
| 12 | 4.53283E-15 | 12 |
| 13 | -1.753860455 | 13 |
| 14 | -4.32512654 | 14 |
| 15 | -6.045996595 | 15 |
| 16 | -7.277055963 | 16 |
| 17 | -7.918571535 | 17 |
| 18 | -7.918571535 | 18 |
| 19 | -6.277055963 | 19 |
| 20 | -6.045996595 | 20 |
| 21 | -4.32512654 | 21 |
| 22 | -2.253860455 | 22 |
| 23 | -9.06566E-15 | 1 |
| 24 | 2.253860455 | 2 |
| 25 | 6.32512654 | 3 |
| 26 | 6.045996595 | 4 |
| 27 | 11.27705596 | 5 |
| 28 | 7.918571535 | 6 |
| 29 | 7.918571535 | 7 |
| 30 | 7.277055963 | 8 |
| 31 | 6.045996595 | 9 |
| 32 | 4.32512654 | 10 |
| 33 | 2.253860455 | 11 |

(1) continued to FIG. 4B

FIG. 4A continued from FIG. 4A ①

| | | |
|---|---|---|
| 34 | 2.94036E-15 | 12 |
| 35 | -2.253860455 | 13 |
| 36 | -4.32512654 | 14 |
| 37 | -6.45996595 | 15 |
| 38 | -7.277055963 | 16 |
| 39 | -7.918571535 | 17 |
| 40 | -7.918571535 | 18 |
| 41 | -7.277055963 | 19 |
| 42 | -6.045996595 | 20 |
| 43 | -4.32512654 | 21 |
| 44 | -2.253860455 | 22 |
| 45 | -1.81313E-14 | 1 |
| 46 | 2.253860455 | 2 |
| 47 | 4.32512654 | 3 |
| 48 | 6.045996595 | 4 |
| 49 | 7.277055963 | 5 |
| 50 | 7.918571535 | 6 |
| 51 | 7.918571535 | 7 | continued from FIG. 4A ①

FIG. 4B

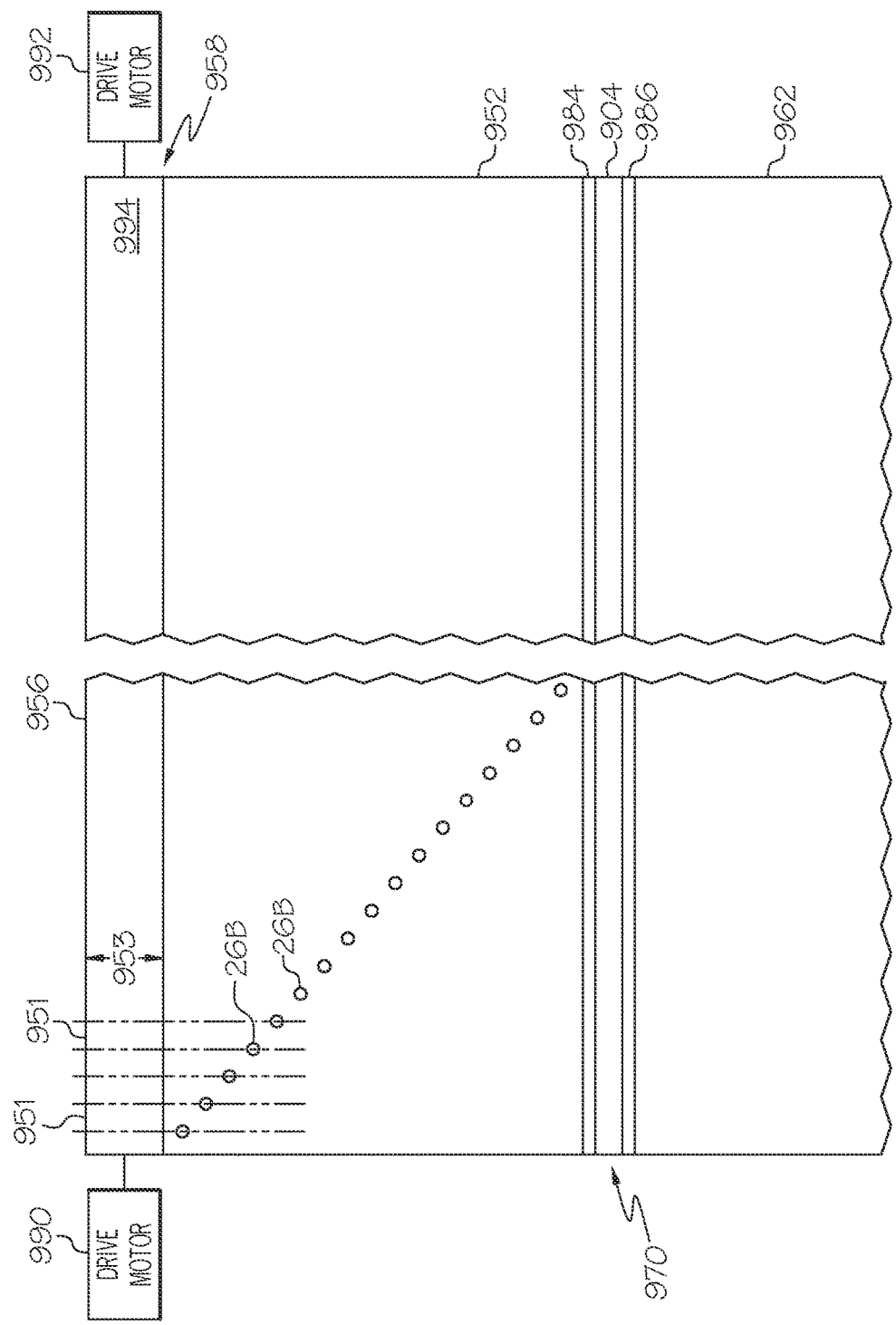

NIP 958

| | AXIAL SEGMENT | | | | | ... | | | | |
|---|---|---|---|---|---|---|---|---|---|---|
| | 1 | 2 | 3 | 4 | 5 | | 95 | 96 | 97 | 98 | 99 | 100 |
| 1 | 10.37257 | 7.68562 | 7.528603 | 7.787721 | 7.849796 | | 8.334988 | 8.070889 | 7.811779 | 8.137692 | 8.290392 | 7.786298 |
| 2 | 10.28398 | 7.573164 | 7.656087 | 7.820751 | 7.830871 | | 8.393069 | 8.112862 | 7.790443 | 8.169714 | 8.530422 | 7.893666 |
| 3 | 10.2446 | 7.547727 | 7.44899 | 7.786458 | 7.72429 | | 8.347393 | 8.14358 | 8.02551 | 8.147361 | 8.395143 | 7.852349 |
| 4 | 10.16122 | 7.628373 | 7.436181 | 7.527374 | 7.742127 | | 8.372758 | 7.835398 | 8.079929 | 8.267521 | 8.496287 | 7.635682 |
| 5 | 10.02059 | 7.373728 | 7.61054 | 7.712682 | 7.560606 | | 8.250207 | 7.860576 | 8.142802 | 8.283691 | 8.434943 | 7.686456 |
| 6 | 10.04886 | 7.297372 | 7.519906 | 7.697006 | 7.626092 | | 8.193753 | 7.803114 | 8.146638 | 8.260256 | 8.472344 | 7.846363 |
| 7 | 9.973772 | 7.149319 | 7.452465 | 7.567744 | 7.504041 | | 8.263896 | 7.796418 | 8.097378 | 8.255984 | 8.2291 | 7.592541 |
| 8 | 9.879054 | 6.964978 | 7.300627 | 7.61734 | 7.435593 | | 8.158197 | 7.867937 | 7.956049 | 8.203154 | 8.2287 | 7.618504 |
| 9 | 9.940098 | 6.913341 | 7.018887 | 7.372468 | 7.200492 | | 8.292437 | 7.904102 | 7.903517 | 8.212152 | 8.189142 | 7.550921 |
| 10 | 9.86071 | 6.749334 | 7.018887 | 7.298752 | 7.326298 | | 8.137361 | 7.662664 | 7.897953 | 8.229842 | 8.136629 | 7.58217 |
| 11 | 9.900488 | 6.828212 | 6.923742 | 7.398774 | 7.361837 | | 8.080293 | 7.653486 | 7.888208 | 8.131855 | 8.150023 | 7.508881 |
| 12 | 9.866126 | 6.739222 | 6.724188 | 7.357584 | 7.487003 | | 7.995725 | 7.830272 | 7.69249 | 8.038187 | 8.0652 | 7.411307 |
| 13 | 9.960373 | 6.993482 | 6.729315 | 7.409967 | 7.555122 | | 7.933104 | 7.768261 | 7.508026 | 7.975715 | 8.251273 | 7.437729 |
| 14 | 9.958531 | 7.233798 | 7.011713 | 7.630195 | 7.61496 | | 7.896526 | 7.59335 | 7.498024 | 7.900392 | 7.946261 | 7.363193 |
| 15 | 10.07558 | 7.168522 | 7.100015 | 7.801995 | 7.696493 | | 7.616472 | 7.335762 | 7.262712 | 7.837216 | 7.659119 | 7.05262 |
| 16 | 10.19713 | 7.133973 | 7.334974 | 7.908464 | 7.954577 | | 7.4631 | 7.117765 | 7.131811 | 7.69492 | 7.7112267 | 6.80177 |
| 17 | 10.09612 | 7.208949 | 7.158744 | 7.819613 | 8.029256 | | 7.453576 | 7.013867 | 7.100732 | 7.428561 | 7.339216 | 6.938946 |
| 18 | 10.11968 | 7.257456 | 7.340482 | 7.772028 | 8.169368 | | 7.527455 | 6.918758 | 7.004417 | 7.391112 | 7.432131 | 6.59959 |
| 19 | 10.12555 | 7.390742 | 7.45695 | 7.917006 | 8.14141 | | 7.545941 | 6.87814 | 6.945307 | 7.487297 | 7.452951 | 6.720612 |
| 20 | 10.21321 | 7.53055 | 7.576044 | 7.873941 | 8.301921 | | 7.555694 | 7.160132 | 6.947649 | 7.68937 | 7.598376 | 6.55073 |
| 21 | 10.28876 | 7.567063 | 7.609077 | 8.025825 | 8.232303 | | 7.518184 | 7.230052 | 7.109199 | 7.623708 | 7.449965 | 6.949136 |
| 22 | 10.18021 | 7.696942 | 7.648888 | 8.069022 | 8.319383 | | 7.567559 | 7.233395 | 7.255095 | 7.544536 | 7.634494 | 7.10908 |
| 23 | 10.1891 | 7.82862 | 7.703031 | 8.075356 | 8.456889 | | 7.783206 | 7.393988 | 7.470072 | 7.786124 | 7.747643 | 7.114337 |
| 24 | 10.25579 | 7.691544 | 7.635684 | 8.214369 | 8.298363 | | 7.945063 | 7.540942 | 7.444517 | 7.877428 | 7.783136 | 7.396628 |
| 25 | 10.29022 | 7.925044 | 7.596928 | 8.125451 | 8.333672 | | 7.874715 | 7.689029 | 7.596803 | 7.855641 | 7.889384 | 7.463267 |

| | | | | | | | | |
|---|---|---|---|---|---|---|---|---|
| 26 | 10.32055 | 7.976932 | 7.690308 | 8.259012 | 8.366341 | 8.123557 | 7.616167 | 7.602275 | 7.882454 | 7.852718 | 7.339624 |
| 27 | 10.28217 | 7.812136 | 7.701845 | 8.248753 | 8.243929 | 8.040411 | 7.851857 | 7.724909 | 8.061349 | 7.979057 | 7.292142 |
| 28 | 10.18764 | 7.83659 | 7.698239 | 8.06261 | 8.244761 | 8.031929 | 7.915122 | 7.781769 | 7.937226 | 8.001067 | 7.636296 |
| 29 | 10.23181 | 7.845018 | 7.722395 | 7.904235 | 8.287802 | 8.048275 | 8.039038 | 7.615578 | 7.849012 | 7.978703 | 7.780767 |
| 30 | 10.3057 | 7.960353 | 7.503295 | 7.984704 | 8.271714 | 8.253671 | 7.966121 | 7.792402 | 8.007939 | 8.086669 | 7.702446 |
| 31 | 10.17928 | 8.025134 | 7.543038 | 8.096873 | 8.277051 | 8.16043 | 8.017791 | 7.787399 | 8.087196 | 8.152895 | 7.688135 |
| 32 | 10.32506 | 7.977842 | 7.569766 | 7.981682 | 8.184773 | 8.288439 | 8.053177 | 7.704765 | 8.0375 | 8.225035 | 7.857318 |
| 33 | 10.31758 | 7.897414 | 7.618799 | 8.20807 | 8.25638 | 8.338779 | 8.013628 | 7.787134 | 7.933946 | 8.126485 | 7.808861 |
| 34 | 10.23324 | 8.09453 | 7.683337 | 8.152268 | 8.213384 | 8.486623 | 8.158397 | 7.673302 | 8.132747 | 8.310795 | 7.655492 |
| 35 | 10.17724 | 8.092114 | 7.52411 | 8.132876 | 8.075725 | 8.270117 | 8.008066 | 7.802079 | 8.19707 | 8.121175 | 7.917927 |
| 36 | 10.30714 | 8.153939 | 7.74092 | 8.032688 | 8.201656 | 8.239809 | 8.086654 | 7.919855 | 8.111364 | 8.108109 | 7.743419 |
| 37 | 10.28568 | 8.102964 | 7.711065 | 8.287987 | 8.153364 | 8.343267 | 7.939613 | 7.842675 | 7.962536 | 8.111703 | 7.750363 |
| 38 | 10.26945 | 8.073692 | 7.618856 | 7.985174 | 8.160478 | 8.418002 | 7.992895 | 7.893463 | 8.091444 | 8.256786 | 7.984295 |
| 39 | 10.29949 | 7.966951 | 7.735446 | 7.980688 | 8.072558 | 8.54121 | 7.996063 | 7.809364 | 8.091654 | 8.234356 | 7.885507 |
| 40 | 10.21827 | 7.996064 | 7.605107 | 7.941698 | 7.945901 | 8.27011 | 8.130954 | 7.826944 | 8.014809 | 8.168383 | 7.940475 |
| 41 | 10.25998 | 8.127288 | 7.786307 | 7.955313 | 7.943095 | 8.255673 | 8.063357 | 7.724054 | 7.99269 | 8.260723 | 7.979153 |
| 42 | 10.18835 | 8.054116 | 7.690644 | 7.917926 | 7.94539 | 8.344867 | 8.166873 | 7.667087 | 8.078229 | 8.381571 | 7.873492 |
| 43 | 10.23799 | 8.0411 | 7.752333 | 7.976628 | 8.141473 | 8.464261 | 8.184065 | 7.819648 | 8.077761 | 8.237336 | 7.695519 |
| 44 | 10.20397 | 7.912445 | 7.917742 | 7.934565 | 8.077176 | 8.419677 | 8.237626 | 7.984092 | 8.227491 | 8.504916 | 7.849769 |
| 45 | 10.37557 | 7.766108 | 7.971554 | 7.97928 | 7.889494 | 8.392247 | 8.267577 | 7.922628 | 8.231716 | 8.39535 | 7.91794 |
| 46 | 10.32275 | 7.879632 | 8.014056 | 7.917413 | 7.979827 | 8.317156 | 8.183373 | 7.927356 | 8.275442 | 8.425974 | 7.967939 |
| 47 | 10.3465 | 7.744077 | 7.871804 | 7.825915 | 8.030198 | 8.419291 | 8.276618 | 7.935682 | 8.294605 | 8.559163 | 7.906344 |
| 48 | 10.32636 | 7.578824 | 7.994883 | 7.8711 | 7.903271 | 8.297755 | 8.098392 | 7.913411 | 8.147471 | 8.420389 | 7.957781 |
| 49 | 10.29455 | 7.837259 | 7.81973 | 7.83206 | 7.807086 | 8.426363 | 8.040268 | 7.897039 | 8.331083 | 8.573236 | 7.830582 |
| 50 | 10.28662 | 7.845979 | 7.681826 | 8.056742 | 7.995936 | 8.390086 | 8.031878 | 7.992515 | 8.227614 | 8.495777 | 7.671179 |

FIG. 11A2

| NIP 970 | | | | | | | | | | |
|---|---|---|---|---|---|---|---|---|---|---|
| AXIAL SEGMENT | 1 | 2 | 3 | 4 | 5 | ... | 95 | 96 | 97 | 98 | 99 | 100 |
| 1 | 39.40469 | 44.64872 | 44.68196 | 44.24798 | 44.29567 | | 43.38703 | 43.88286 | 44.16028 | 43.5196 | 43.28486 | 44.37162 |
| 2 | 39.48821 | 44.90247 | 44.72813 | 44.35892 | 44.37554 | | 43.1904 | 43.76727 | 44.32859 | 43.54526 | 42.9676 | 44.38372 |
| 3 | 39.57138 | 44.87752 | 45.01861 | 44.48711 | 44.51324 | | 43.3602 | 43.74557 | 43.96211 | 43.55744 | 43.13978 | 44.35728 |
| 4 | 39.63246 | 44.80789 | 45.13923 | 44.79068 | 44.63619 | | 43.43145 | 44.36045 | 44.38593 | 43.3963 | 43.10477 | 44.6787 |
| 5 | 39.75223 | 45.18833 | 44.92596 | 44.71507 | 44.88829 | | 43.52157 | 44.33463 | 43.86052 | 43.31029 | 43.05837 | 44.71423 |
| 6 | 39.88858 | 45.48386 | 44.94626 | 44.78608 | 44.85742 | | 43.64614 | 44.3361 | 43.69075 | 43.24941 | 43.06456 | 44.43737 |
| 7 | 40.00039 | 45.79334 | 45.05394 | 44.8271 | 45.07763 | | 43.36894 | 44.37421 | 43.86426 | 43.47783 | 43.62073 | 44.84006 |
| 8 | 40.12534 | 46.01071 | 45.54607 | 44.92282 | 45.26679 | | 43.59435 | 44.30217 | 44.10407 | 43.48642 | 43.57722 | 44.83099 |
| 9 | 40.22901 | 46.23048 | 45.96428 | 45.14532 | 45.47153 | | 43.38676 | 44.20753 | 44.17285 | 43.55354 | 43.52741 | 44.85935 |
| 10 | 40.28573 | 46.48972 | 46.22128 | 45.40736 | 45.41403 | | 43.67511 | 44.53495 | 44.27638 | 43.53572 | 43.59895 | 44.82391 |
| 11 | 40.2182 | 46.4876 | 46.3441 | 45.2985 | 45.2992 | | 43.83583 | 44.56455 | 44.25958 | 43.62247 | 43.79136 | 44.78604 |
| 12 | 40.17332 | 46.31417 | 46.47063 | 45.1227 | 44.99165 | | 44.02086 | 44.34047 | 44.65957 | 43.95242 | 43.79238 | 45.07137 |
| 13 | 40.04378 | 46.03594 | 46.0968 | 44.98813 | 44.94629 | | 44.07167 | 44.43954 | 45.04121 | 44.14148 | 43.57541 | 45.20161 |
| 14 | 39.98109 | 45.64301 | 45.80793 | 44.66675 | 44.81566 | | 44.12067 | 44.86425 | 45.12355 | 44.2035 | 43.96943 | 45.36951 |
| 15 | 39.77724 | 45.66581 | 45.61295 | 44.51258 | 44.61662 | | 44.78409 | 45.33976 | 45.23708 | 44.26274 | 44.62702 | 45.87438 |
| 16 | 39.7374 | 45.81896 | 45.5266 | 44.26305 | 44.28829 | | 45.07738 | 45.64867 | 45.65084 | 44.73772 | 44.62684 | 46.20825 |
| 17 | 39.68681 | 45.54317 | 45.24319 | 44.37379 | 43.99978 | | 45.17609 | 45.83547 | 45.79298 | 45.06875 | 45.09522 | 46.20643 |
| 18 | 39.59644 | 45.38514 | 45.14277 | 44.42864 | 43.71669 | | 45.06638 | 46.1597 | 46.00322 | 45.1921 | 45.24579 | 46.66211 |
| 19 | 39.56593 | 45.22587 | 44.87939 | 44.13907 | 43.71877 | | 44.90212 | 46.18452 | 46.08479 | 45.02724 | 45.02425 | 46.67674 |
| 20 | 39.59857 | 44.87456 | 44.84245 | 44.0571 | 43.50009 | | 45.05621 | 45.86214 | 46.12925 | 44.5811 | 44.8907 | 46.86193 |
| 21 | 39.5334 | 44.87372 | 44.76908 | 44.05796 | 43.59592 | | 44.77072 | 45.55603 | 45.57674 | 44.69412 | 45.19079 | 46.110625 |
| 22 | 39.58043 | 44.55612 | 44.77399 | 43.76248 | 43.37317 | | 44.71051 | 45.40076 | 45.38863 | 44.85498 | 44.76347 | 45.9411 |
| 23 | 39.56958 | 44.44428 | 44.8625 | 43.89351 | 43.25237 | | 44.38339 | 45.110465 | 45.16931 | 44.36919 | 44.52828 | 45.854 |
| 24 | 39.49574 | 44.53013 | 44.97218 | 43.64908 | 43.44412 | | 44.19854 | 44.77079 | 45.21055 | 44.23204 | 44.3894 | 45.26929 |
| 25 | 39.49129 | 44.29326 | 44.81786 | 43.77349 | 43.43453 | | 44.12254 | 44.60656 | 44.79264 | 44.37189 | 44.40364 | 45.09325 |

FIG. 11B1

| | | | | | | | | |
|---|---|---|---|---|---|---|---|---|
| 26 | 39.49722 | 44.23999 | 44.71194 | 43.62977 | 43.33651 | 43.78273 | 44.68384 | 44.70685 | 44.13572 | 44.15295 | 45.18616 |
| 27 | 39.47728 | 44.43354 | 44.69325 | 43.52589 | 43.4704 | 43.94496 | 44.3789 | 44.36005 | 44.01969 | 43.94884 | 45.25824 |
| 28 | 39.54252 | 44.27987 | 44.54501 | 43.91362 | 43.38304 | 43.94673 | 44.1241 | 44.51344 | 44.11575 | 43.94733 | 44.83192 |
| 29 | 39.47213 | 44.19322 | 44.61434 | 44.183 | 43.56696 | 43.80163 | 43.98051 | 44.76828 | 44.07271 | 43.98479 | 44.48219 |
| 30 | 39.54663 | 44.06752 | 44.76625 | 44.0123 | 43.55719 | 43.55462 | 44.26177 | 44.49337 | 44.03837 | 43.85909 | 44.63112 |
| 31 | 39.64268 | 43.96443 | 44.94763 | 44.06804 | 43.42871 | 43.52658 | 44.03715 | 44.42401 | 43.82997 | 43.70611 | 44.70111 |
| 32 | 39.47899 | 44.06631 | 44.93447 | 44.1835 | 43.67584 | 43.50643 | 43.84722 | 44.50122 | 43.81352 | 43.50083 | 44.36334 |
| 33 | 39.63553 | 44.26176 | 44.72037 | 43.68667 | 43.60231 | 43.55827 | 43.9759 | 44.54341 | 43.98547 | 43.60351 | 44.47767 |
| 34 | 39.58361 | 43.84993 | 44.62386 | 43.74978 | 43.53632 | 43.23178 | 43.60206 | 44.50713 | 43.67788 | 43.60229 | 44.5238 |
| 35 | 39.56659 | 43.82855 | 44.74692 | 43.612 | 43.79759 | 43.3624 | 43.88854 | 44.52649 | 43.72399 | 43.79831 | 44.25268 |
| 36 | 39.45527 | 43.77556 | 44.66357 | 43.94323 | 43.65728 | 43.53431 | 43.99869 | 44.19726 | 43.79503 | 43.69985 | 44.55615 |
| 37 | 39.48101 | 43.87136 | 44.58544 | 43.50101 | 43.67762 | 43.38392 | 44.07337 | 44.41778 | 44.02888 | 43.69141 | 44.5054 |
| 38 | 39.47185 | 43.75162 | 44.73444 | 43.97618 | 43.80422 | 43.11254 | 44.11211 | 44.30895 | 43.89662 | 43.62408 | 44.12215 |
| 39 | 39.47238 | 44.08808 | 44.47988 | 43.96263 | 43.85385 | 43.12679 | 43.78543 | 44.46989 | 43.91549 | 43.52229 | 44.13298 |
| 40 | 39.52909 | 44.25744 | 44.61555 | 44.01029 | 43.90707 | 43.43221 | 43.72954 | 44.34748 | 43.98097 | 43.64629 | 44.11164 |
| 41 | 39.46851 | 43.9259 | 44.35778 | 43.96794 | 44.17093 | 43.36974 | 43.86071 | 44.55448 | 43.96592 | 43.50479 | 44.08632 |
| 42 | 39.418 | 43.98057 | 44.49631 | 44.24365 | 44.05849 | 43.43403 | 43.8375 | 44.53914 | 43.8761 | 43.23738 | 44.39641 |
| 43 | 39.457 | 43.92981 | 44.40968 | 43.94596 | 43.81032 | 43.08042 | 43.73479 | 44.28791 | 43.81187 | 43.46514 | 44.51893 |
| 44 | 39.42109 | 44.11248 | 44.29315 | 44.055 | 43.84518 | 43.092 | 43.72335 | 44.21282 | 43.47514 | 43.16772 | 44.30204 |
| 45 | 39.38915 | 44.28868 | 44.03785 | 44.08928 | 44.0226 | 43.01404 | 43.5914 | 44.072 | 43.43809 | 43.13055 | 44.10863 |
| 46 | 39.31609 | 44.40491 | 44.03414 | 44.21078 | 44.04247 | 43.37022 | 43.54768 | 44.1944 | 43.50634 | 43.06406 | 44.24497 |
| 47 | 39.39496 | 44.56781 | 44.35538 | 44.35377 | 43.964 | 43.39998 | 43.5032 | 44.17732 | 43.46162 | 43.29306 | 44.27378 |
| 48 | 39.31001 | 44.69277 | 44.11353 | 44.18423 | 44.12282 | 43.24698 | 43.67757 | 44.17825 | 43.69715 | 43.18251 | 44.06843 |
| 49 | 39.34313 | 44.51026 | 44.35762 | 44.21529 | 44.39382 | 43.17082 | 43.69201 | 44.22174 | 43.46012 | 43.07337 | 44.45884 |
| 50 | 39.40947 | 44.31301 | 44.53479 | 44.09234 | 44.01948 | 43.24989 | 43.93653 | 44.12079 | 43.50045 | 43.13984 | 44.51934 |

FIG. 11B2

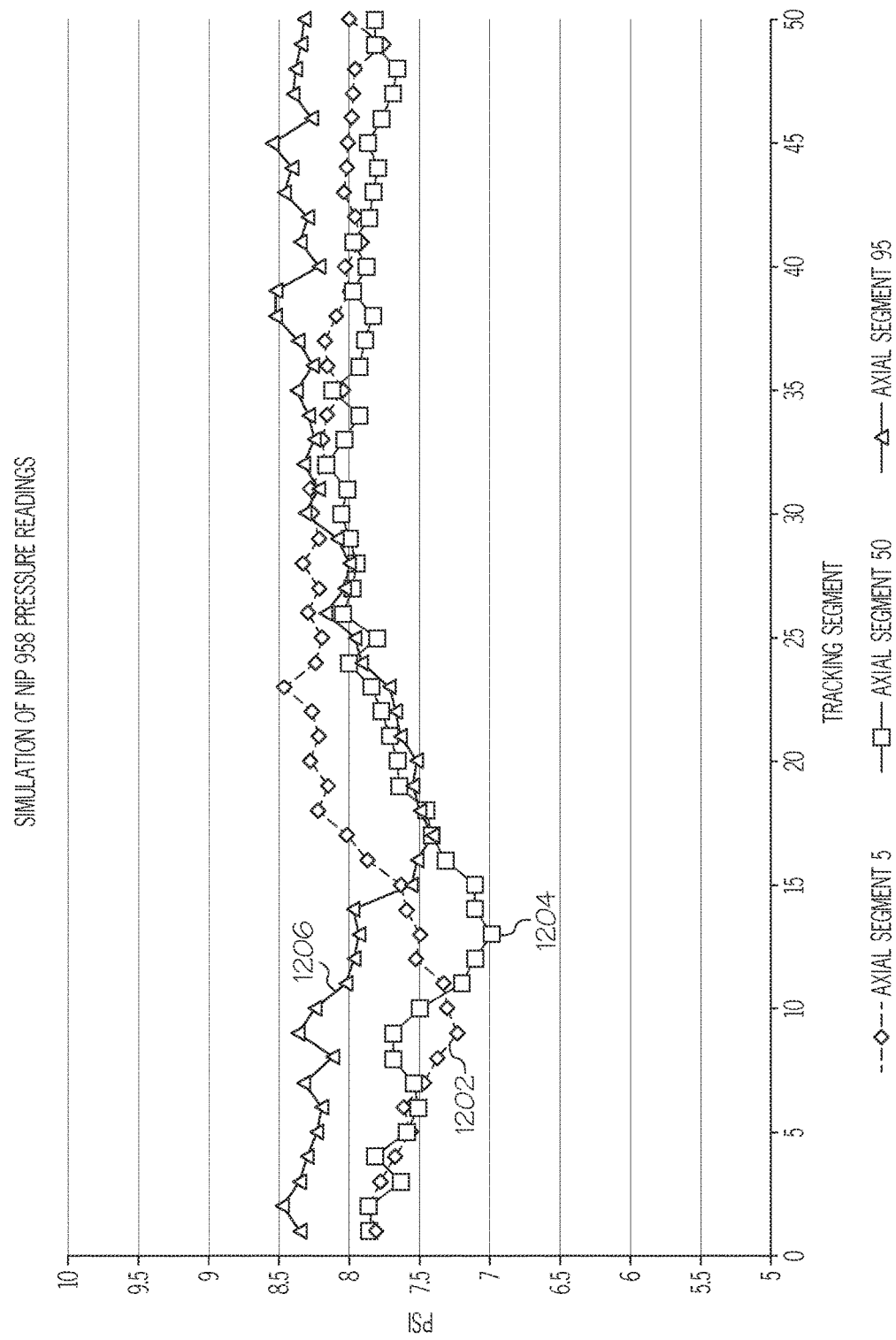

MONITORING APPLICATOR RODS AND APPLICATOR ROD NIPS

RELATED APPLICATIONS

The present application is related to U.S. patent application Ser. No. 14/735,716 entitled MONITORING APPLICATOR RODS filed concurrently herewith, U.S. patent application Ser. No. 14/735,947 entitled MONITORING MACHINE WIRES AND FELTS filed concurrently herewith, U.S. patent application Ser. No. 14/735,655 entitled MONITORING UPSTREAM MACHINE WIRES AND FELTS filed concurrently herewith, U.S. patent application Ser. No. 14/735,892 entitled COUNT-BASED MONITORING MACHINE WIRES AND FELTS filed concurrently herewith, and U.S. patent application Ser. No. 14/736,010 entitled MONITORING OSCILLATING COMPONENTS filed concurrently herewith, the disclosures of which are incorporated by reference herein in their entirety.

FIELD

The present invention relates generally to papermaking and, more particularly to monitoring one or more components in the papermaking process.

BACKGROUND

Nipped rolls are used in a vast number of continuous process industries including, for example, papermaking, steel making, plastics calendaring and printing. In the process of papermaking, many stages are required to transform headbox stock into paper. The initial stage is the deposition of the headbox stock, commonly referred to as "white water," onto a paper machine forming fabric, commonly referred to as a "wire." Upon deposition, a portion of the white water flows through the interstices of the forming fabric wire leaving a mixture of liquid and fiber thereon. This mixture, referred to in the industry as a "web," can be treated by equipment which further reduce the amount of moisture content of the finished product. The fabric wire continuously supports the fibrous web and transfers it to another fabric called a felt which advances it through the various dewatering equipment that effectively removes the desired amount of liquid from the web. Water from the web is pressed into the wet felt and then can be removed as the wet felt passes a suction box. Dry felts can also be used to support the fibrous web through steam dryers.

One of the stages of dewatering is effected by passing the web through a pair or more of rotating rolls which form a nip press or series thereof, during which liquid is expelled from the web via the pressure being applied by the rotating rolls. The rolls, in exerting force on the web and felt, will cause some liquid to be pressed from the fibrous web into the felt. The web can then be advanced to other presses or dry equipment which further reduce the amount of moisture in the web. The "nip region" is the contact region between two adjacent rolls through which the paper web passes.

The condition of the various wires and felts can cause variations in the amount of liquid and other materials that are removed from the web which can, in turn, alter an amount of nip pressure applied to the web in a nip region. Other components in the papermaking process such as size application stations, coating stations, doctor blades, and oscillating showers can also affect the characteristics of the web. Even nip pressure axially along the roll is beneficial in papermaking and contributes to moisture content, caliper, sheet strength and surface appearance. For example, a lack of uniformity in the nip pressure can often result in paper of poor quality. Thus, there remains a need to monitor various components of the papermaking process and account for their potential effect on nip pressure at one or more nip regions.

SUMMARY

In accordance with one aspect of the present invention a system associated with a sensing roll for collecting roll data includes a plurality of sensors located at axially spaced-apart locations of the sensing roll, wherein each sensor enters a region of a first nip between the sensing roll and a rotating component during each rotation of the sensing roll. The system also includes an application station, comprising a rotating applicator rod with an axis of rotation substantially parallel to that of the sensing roll and forming a second nip with the sensing roll, wherein each sensor enters a region of the second nip between the sensing roll and the applicator rod during each rotation of the sensing roll. Further, each sensor generates a respective sensor signal upon entering a region of the second nip and the system includes structure for generating a periodically occurring starting reference associated with each rotation of the applicator rod. A processor receives the periodically occurring starting reference and the respective sensor signal generated by each sensor as it moves through the second nip and, upon receiving the respective sensor signal, the processor operates to a) determine a particular one of the plurality of sensors which generated the respective sensor signal, b) based upon a value occurring between when the respective sensor signal was generated and a most recent starting reference, identify one of a plurality of tracking segments, wherein each of the plurality of tracking segments is, respectively, associated with a different value, and c) store the respective sensor signal to associate the respective sensor signal with the identified one tracking segment.

The purpose of the applicator rod is to provide an even coating in the cross direction to an applicator roll, which may comprise the sensing roll, for transfer to a web when pressed in the first nip. Both grooved and smooth rods are at times used depending upon the viscosity of the coating and the end product. Grooved rods have alternating ridges and valleys in which an outer surface of each ridge comes in contact with the applicator roll in order to meter the correct amount of coating through open areas, or valleys, between the applicator roll and the applicator rod. The pressure of a grooved rod therefore may be directly measured by the sensing roll, when defining the applicator roll, from this contact. In some instance there may be a thin film, or coating, that is present between one or more of the ridges and the applicator roll; however the sensed pressure may be considered as a directly measured pressure of the applicator rod. The smooth rod may also have a pressure applied in a direction toward the sensing roll; however, there should always be a layer of coating between a smooth rod and the applicator roll. Hence, the sensing roll can only detect the hydraulic force transmitting through the coating from the smooth rod. The rods are held along their cross-direction (CD) axis by a number of holders which are adjusted to keep pressure across the CD for both the grooved rods and the smooth rods.

Typically grooved rods are used with starch applications and the equipment is referred to as a Size Press, or press rod. Smooth rods are commonly used for coating and the equipment is referred to as a rod coater or coating rod. Both types of rods may rotate with a surface velocity different than that of the applicator roll.

In accordance with one aspect of the present invention the rotating component comprises a mating roll, a web of material travels through the first nip from an upstream direction to a downstream direction, and each sensor generates a respective sensor signal upon entering a region of the first nip. In accordance with a different aspect, each sensor generates a respective sensor signal upon entering a region of the second nip.

In accordance with related aspects of the invention each of the respective sensor signals comprises a pressure value. In accordance with other aspects of the invention the applicator rod comprises a size press rod or a coating rod.

In a related aspect of the present invention the processor receives the respective sensor signal for each of the plurality of sensors during each rotation of the sensing roll, and a plurality of the respective sensor signals occur during a plurality of rotations of the sensing roll. For each one of the plurality of the respective sensor signals, the processor identifies an associated applicator rod axial segment and its determined one tracking segment.

In yet another related aspect, the applicator rod comprises n axial segments, having respective index values: 1, 2, . . . , n; the applicator rod period comprises m tracking segments, having respective index values: 1, 2, . . . , m, such that there are (n times m) unique permutations that are identifiable by a two-element set comprising a respective axial segment index value and a respective tracking segment index value. A respective average pressure value can be associated with each of the (n times m) unique permutations, each of the respective average pressure values based on previously collected pressure readings related to the second nip.

In another related aspect of the present invention, the plurality of tracking segments associated with the applicator rod comprise one of a) a plurality of circumferential segments on the applicator rod or b) a plurality of time segments of a period of the applicator rod.

In accordance with another aspect of the invention, a method associated with a sensing roll for collecting roll data includes providing a plurality of sensors located at axially spaced-apart locations of the sensing roll, wherein each sensor enters a region of a first nip between the sensing roll and a rotating component during each rotation of the sensing roll. The method also includes providing an application station, having a rotating applicator rod with an axis of rotation substantially parallel to that of the sensing roll and forming a second nip with the sensing roll such that each sensor enters a region of the second nip during each rotation of the sensing roll; wherein each sensor generates a respective sensor signal upon entering a region of the second nip. The method also includes generating a periodically occurring starting reference associated with each rotation of the applicator rod; and receiving the periodically occurring starting reference and the respective sensor signal generated by each sensor. Upon receiving the respective sensor signal: a) a particular one of the plurality of sensors which generated the respective sensor signal is determined, b) based upon a value occurring between when the respective sensor signal was generated and a most recent starting reference, one of a plurality of tracking segments is identified, wherein each of the plurality of tracking segments is, respectively, associated with a different value, and c) the respective sensor signal is stored to associate the respective sensor signal with the identified one tracking segment.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements.

FIGS. 4A and 4B are a table of how collecting x sensor readings from a sensor would be associated with the different circumferential segments of the mating roll, in accordance with the principles of the present invention.

FIG. 9C and FIG. 10 illustrate details about the application station of FIG. 9B.

FIGS. 11A1-12B illustrate a simulated data set representing collecting and averaging pressure readings at different nips at a plurality of distinct axial locations in a manner that is time-synchronized with a period of rotation of an applicator rod in accordance with the principles of the present invention.

DETAILED DESCRIPTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

The present application is related to each of the following: U.S. patent application Ser. No. 14/268,672 entitled METHOD AND SYSTEM ASSOCIATED WITH A SENSING ROLL AND A MATING ROLL FOR COLLECTING ROLL DATA, filed May 2, 2014; U.S. patent application Ser. No. 14/268,706 entitled METHOD AND SYSTEM ASSOCIATED WITH A SENSING ROLL AND A MATING ROLL FOR COLLECTING DATA INCLUDING FIRST AND SECOND SENSOR ARRAYS, filed May 2, 2014; and U.S. patent application Ser. No. 14/268,737 entitled METHOD AND SYSTEM ASSOCIATED WITH A SENSING ROLL INCLUDING PLURALITIES OF SENSORS AND A MATING ROLL FOR COLLECTING ROLL DATA, filed May 2, 2014, the disclosures of which are incorporated by reference herein in their entirety.

Figure 1:
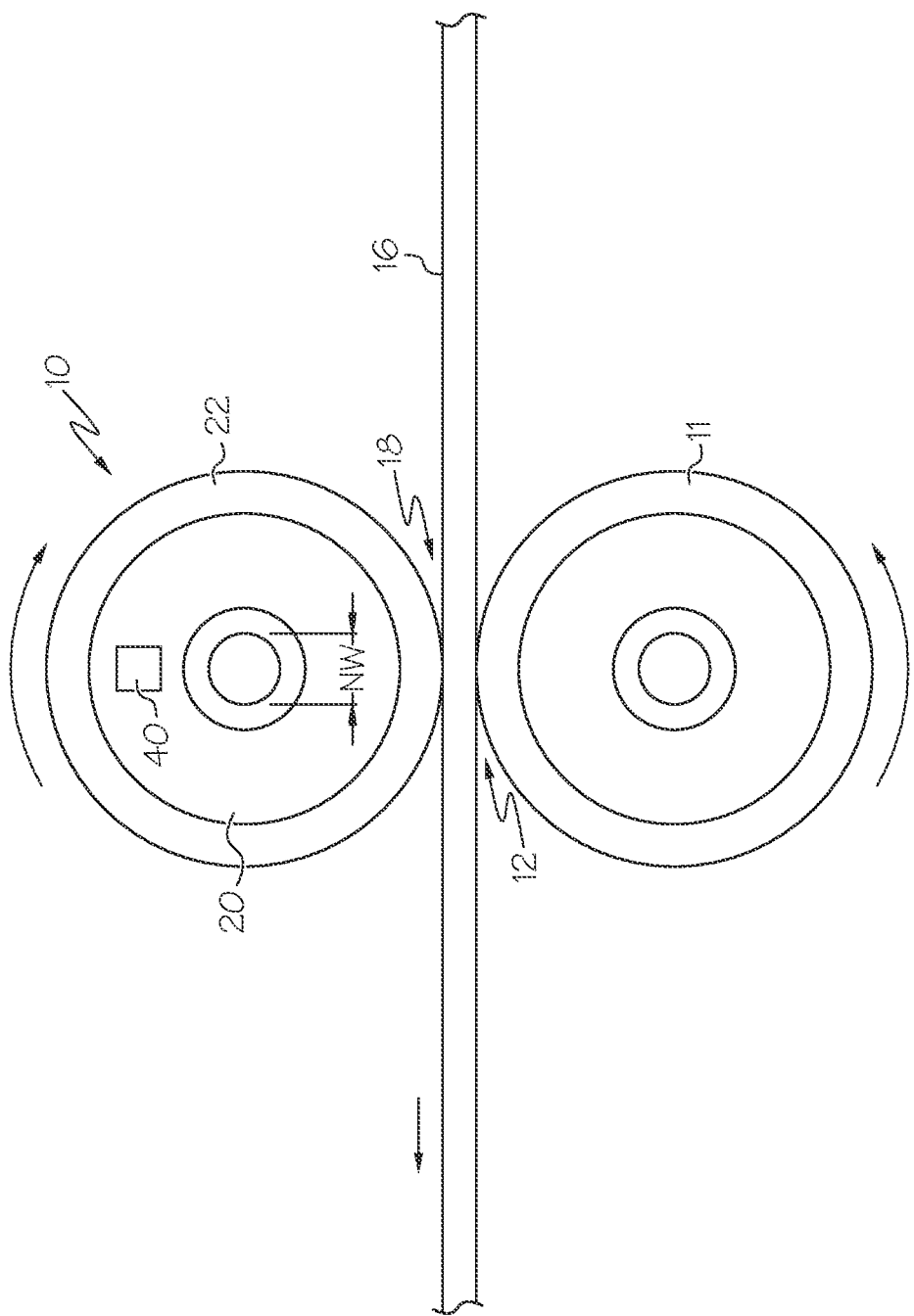
FIG. 1 is an end, schematic view of a nip press, in accordance with the principles of the present invention, showing the formation of a web nipped between the nip rolls, the nip width of the nip press being designated by the letters "NW."
Figure 2:
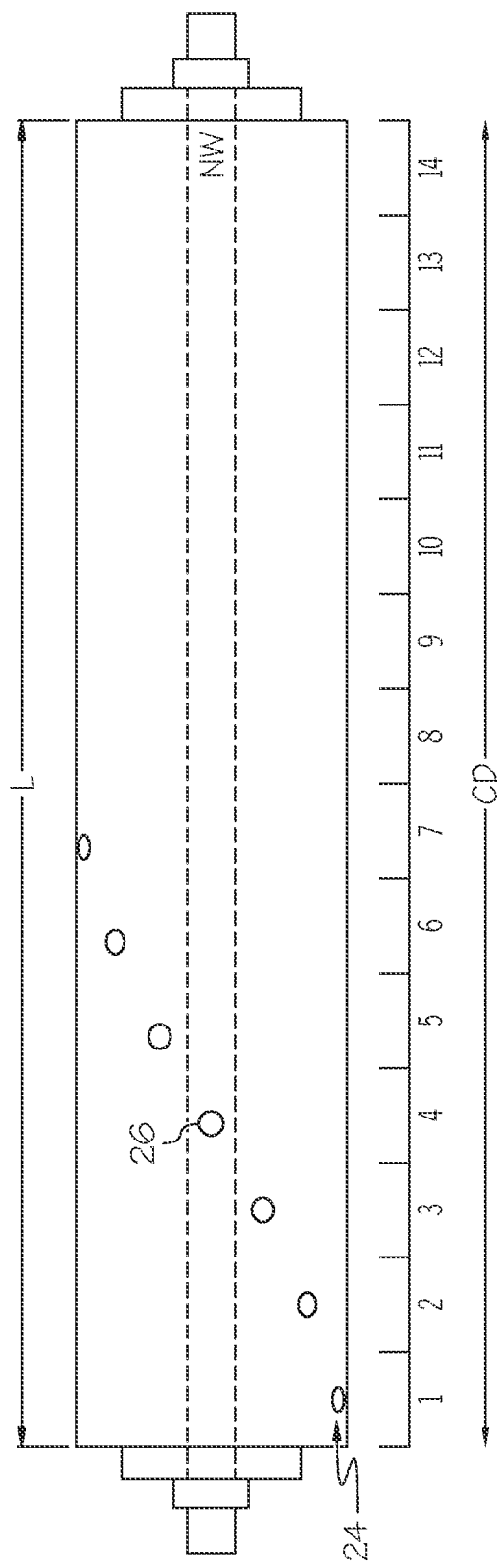
FIG. 2 is a side elevation view of a sensing roll showing the placement of a line of sensors in accordance with the principles of the present invention.

As illustrated in FIG. 1, a sensing roll 10 and a mating roll 11 define a nip 12 receiving a fibrous web 16, such as a paper web, to apply pressure to the web 16. It is contemplated that, in some cases, a continuous band felt may support the web such that the felt and the web enter the nip 12. The sensing roll 10 comprises an inner base roll 20 and an outer roll cover 22. As shown in FIG. 2, a set 24 of sensors 26 is disposed at least partially in the roll cover 22. The set 24 of sensors 26 may be disposed along a line that spirals around the entire length of the roll 10 in a single revolution to define a helical pattern, which is a common sensor geometry arrangement for roll covers. However, the helical pattern is merely an example and any arrangement is contemplated in which at least one sensor is placed at each axial position, anywhere along the circumference, at which data is to be collected. Each sensor 26 can, for example, measure the pressure that is being exerted on the sensor when it enters a region of the nip 12 between the rolls 10 and 11. In particular, the set 24 of sensors 26 may be positioned in the sensing roll 10, for example, at different axial locations or segments along the sensing roll 10, wherein the axial segments are preferably equally sized. In the illustrated embodiment, there are fourteen axial segments, labelled 1-14 in FIG. 2, each having one sensor 26 located therein. It is also contemplated that the set 24 of sensors 26 may be linearly arranged so as to define a line of sensors, i.e., all sensors reside at the same circumferential location. One of ordinary skill will readily recognize that more than fourteen, or less than fourteen, axial segments may be provided as well along with a corresponding equal number of axially-spaced sensors located on the sensing roll. Also, in the description below, each sensor 26 may be referred to as a pressure sensor, for example, but other types of sensors can also be contemplated such as, for example, temperature sensors.

Because having even nip pressure is beneficial during paper manufacturing, correctly calculating and displaying the nip pressure profile are also beneficial since any corrections or adjustments to be made to the rotating rolls based on an inaccurate calculated nip pressure profile could certainly exacerbate any operational problems. There are three primary measurements of variability. The nip pressure profile has variability that can be termed cross-directional variability as it is the variability of average pressure per cross-direction position across the nip. Another type of variability represents the variability of the high speed measurements at each position in the single line of sensors. This variability represents the variability of other equipment in the paper making process including the rotational variability of the mating roll, i.e., the roll nipped to the sensing roll. The third variability in the nip profile includes the variability of multiple sensors, discussed below, at each cross-directional position of the roll. This variability represents the "rotational variability" of the sensing roll as it rotates through its plurality of sensing positions and cannot be detected unless a plurality of sensor are used per position.

One benefit of embedding a single set of sensors in covered rolls is to measure the real-time pressure profile and adjust loading pressures and roll crowns or roll curvature (using, for example, internal hydraulic cylinders) to achieve a flat pressure profile. As an alternative to a single set of sensors, two pluralities or arrays of sensors can be included on a sensing roll as described more fully in the earlier referenced U.S. patent application Ser. No. 14/268,706, which is incorporated herein by reference in its entirety. The sensing roll can, for example, be separated into 14 axial segments. First and second pluralities of sensors, respectfully, are disposed at least partially in the roll cover. Each of the first plurality of sensors is located in one of the 14 axial segments of the sensing roll. Likewise, each of the second plurality of sensors is located in one of the 14 axial segments of the sensing roll. Each sensor of the first plurality has a corresponding sensor from the second plurality located in a same axial segment of the sensing roll. The first plurality of sensors can be disposed along a line that spirals around the entire length of the roll in a single revolution to define a helical pattern. In a similar manner, the second plurality of sensors can be disposed along a line that spirals around the entire length of the roll in a single revolution to define a helical pattern. The first and second pluralities of sensors can be separated from one another by 180 degrees. Each sensor measures the pressure that is being exerted on the sensor when it enters a region of a nip. It is contemplated that the first and second pluralities of sensors may be linearly arranged so as to define first and second lines of sensors, which are spaced approximately 180 degrees apart. Various alternative configurations of a plurality of sensors are also contemplated. For example, a plurality of sensors could be helically arranged in a line that spirals, in two revolutions, around the entire length of roll.

Typically, the sensing roll 10 and the mating roll 11 are sized differently, i.e., they have a different size radially and circumferentially. Each roll may have variations in its size circumferentially across the axial dimension. Further, as the roll rotates, the distance from the central axis (radial dimension) to the outer surface may vary for each axial position at the same angle of rotation even were the circumferential dimensions to be the same for each axial position.

For example, rolls are periodically ground which results is small arbitrary changes in diameter from the manufacture's specification. There may also be slippage with one or more of the rolls resulting in the sensing roll surface traveling at a speed that is different than the mating roll surface. Consequently, it is rare that two rolls would have exactly the same period of rotation or have periods that are exact harmonics.

Thus, as the sensing roll 10 and mating roll 11 travel through multiple rotations relative to one another, a particular sensor 26 may not always enter the region of the nip 12 with the same circumferential portion of the mating roll 11 as it did in a previous rotation. This behavior can be utilized to create data maps corresponding to the surface of the mating roll 11. Different average pressure matrices, each collected and built during different periods of time can be compared with one another to investigate how they vary from one another. Variability between the different data maps can indicate possible problems with the mating roll 11, such as roll surface irregularities, bearing wear, and roll flexing. Variability analysis of the sensor data may also indicate possible problems with upstream or downstream processing equipment, e.g., upstream rolls, an upstream forming wire, an upstream felt, an upstream coating station or downstream rolls.

The sensing and mating rolls 10 and 11 may be each separated into 14 axial segments. All of the axial segments on the sensing roll 10 may or may not be of the same length, and all of the axial segments on the mating roll 11 also may or may not be of the same length. In the illustrated embodiment, it is presumed that all of the axial segments on the sensing roll 10 are of the same length and all of the axial segments on the mating roll 11 are of the same length. The axial segments on the sensing roll 10 may be aligned with the axial segments on the mating roll 11. Furthermore, the mating roll 11 may be separated into individual circumferential segments such as, for example, 22 circumferential segments, all of substantially the same dimension.

Figure 3:
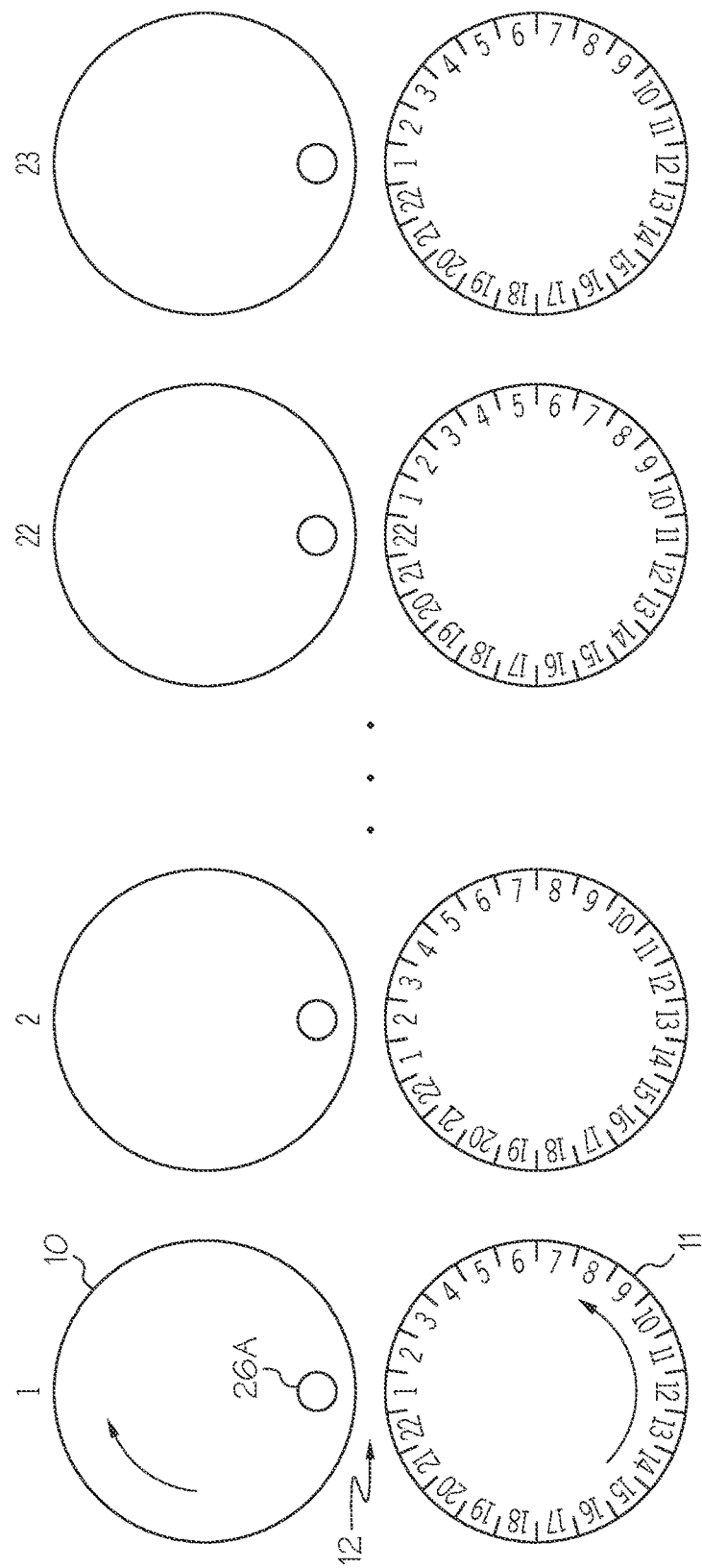
FIG. 3 illustrates how a rotation of the sensing roll and the mating roll can change a circumferential segment of the mating roll that enters a nip region coincidentally with a sensor on each rotation of the sensing roll, in accordance with the principles of the present invention.

FIG. 3 illustrates how rotation of the sensing roll 10 and the mating roll 11 can change a circumferential segment of the mating roll 11 that enters a nip region coincidentally with a sensor on each rotation of the sensing roll 10. FIG. 3 is presented as series of position snapshots from 1 to 23 of the sensing roll 10 which also correspond to 22 rotations of the sensing roll 10 and 23 rotations of the mating roll 11. The left-most portion of FIG. 3 shows a starting position (i.e., where a first sensor reading is collected) and the right-most portion represents a position of the two rolls 10 and 11 after 22 rotations of the sensing roll 10 after the first sensor reading was collected. At the starting position, circumferential segment #1 of the mating roll 11 is positioned in the region of the nip 12 along with the sensor 26A. The mating roll 11, in this example, is rotating slightly faster than the sensing roll 10 such that at a second position snapshot following a complete rotation from the starting position, the sensor 26A is once again positioned in the region of the nip 12 but the mating roll 11 has rotated so that circumferential segment #2 is in the region of the nip 12. The values of FIG. 3 are selected just as examples to illustrate with concrete numbers operating principles of the present invention. In accordance with the example values of FIG. 3, when the sensing roll had completed 22 rotations, the mating roll 11 has completed 23 rotations. Thus, after 21 rotations from the starting position (i.e., position #22 in FIG. 3), the sensor 26A of the sensing roll 10 has been able to collect 22 sensor readings, presuming it collected a reading at the starting position and has "seen" all portions of the circumference of the mating roll. Therefore, 22 circumferential segments can be selected as an example number of circumferential segments. One of ordinary skill will recognize that the mating roll 11 could be broken into more circumferential segments but that it would take more than 22 rotations of the sensing roll 10 to collect data from sensor 26A that corresponds to each of the different circumferential segments.

It would be rare that the period of the mating roll would be an integer ratio of the period of the sensing roll. Hence, it is very unlikely a stationary pattern would be maintained between these rolls and this would tend to even out the sampling of the tracking segments.

Because the one sensor 26A enters the region of the nip 12 concurrently with different circumferential segments of the mating roll 11 in the illustrated embodiment, the nip pressure measured by the one sensor 26A may vary during sequential roll rotations due to the change in pressure caused by the mating roll 11. Aspects of the present invention contemplate mapping readings, or signals, from each sensor 26 of the set 24 over time to see how the pressure readings, or signals, vary for each sensor due to each sensor entering the region of the nip 12 concurrently with different circumferential segments of the mating roll 11. As noted above, the mapped data may be used to determine possible problems with the mating roll 11 and, as more fully described below, data collection can be performed involving possible problems related to upstream or downstream processing equipment other than the sensing roll 10 and the mating roll 11.

Hence, the present invention contemplates using sensors 26 to measure for rotational variability that is generated by the high speed rotation of the mating roll 11 when pressure signals, or readings, from the sensors 26 are time synchronized to the mating roll position. In order to measure for rotational variability, the mating roll 11 must have some impact on the pressure in the nip 12 to be measured. The dominant impact on the sensed nip pressure will likely be that of the mating roll 11 which directly presses against the sensing roll 10. However, it may be possible to synchronize sensor measurements with upstream rolls which form another nip and impact the water content and thickness of the web which affect the nip pressure seen by the sensing roll 10. Furthermore, as rolls (not shown) in a downstream nip may pull the web and cause changes in web tension, it may be possible to also synchronize sensor measurements with these rolls. The sensing and mating rolls 10 and 11 will be used to illustrate the principles of this invention; however all principles are applicable to upstream and downstream processing equipment, such as upstream and downstream rolls, an upstream coating station, an upstream forming wire or an upstream felt.

Continuing the example of FIG. 3, the mating roll 11 may have rotational characteristics that generate, for example, a sinusoidal pressure pattern which is about 8 pounds per square inch (psi) peak-to-peak. In the illustrated example of FIGS. 4A and 4B, to start, the pressure pattern is "0" when circumferential segment #1 is in the region of the nip 12. FIGS. 4A and 4B are a table of how collecting 51 sensor readings from sensor 26A would be associated with the different circumferential segments of the mating roll 11. The left column 402 is the sequential number assigned to the sensor reading and the middle column 404 represents a pressure reading value from sensor 26A according to the sinusoidal pattern described above. Each pressure reading value is time-synchronized with the period of rotation of the mating roll 11 by associating that value with one of the circumferential segments of the mating roll 11 that was in the region of the nip 12 when the pressure reading was sensed.

One convenient way to characterize the difference in periodicity is using units-of-measure that measure that difference in terms of time segments, e.g., 22 time segments in the illustrated embodiment. The length of each time segment is the mating roll period divided by the number of predefined time segments. As discussed below, the predefined number of time segments may correspond to a predefined number of mating roll circumferential segments. A period of the sensing roll 10 can be described as being x time segments smaller/larger than a period of the mating roll 11. For example, according to FIG. 3, the sensing roll 10 may have a period that is 1.0 mating roll time segment more than the period of the mating roll 11 (equivalently, the mating roll 11 can have a period that is 1.0 mating roll time segment smaller than the period of the sensing roll). In such an example, as the sensing roll 10 makes one complete revolution, the mating roll 11 will make more than a complete revolution by an amount equal to 1.0 mating roll time segment due to it having a smaller period than the sensing roll 10.

As noted above, the 22 time segments of the mating roll period can correspond to 22 circumferential segments around the mating roll 11. Thus, even though, at a conceptual level, it is the period of the mating roll 11 that is being separated into a plurality of time segments, that concept can correspond to a physical circumference of the mating roll 11, wherein each individual time segment of the mating roll period also corresponds to a circumferential segment around the mating roll 11. Accordingly, differences in rotational periods between the sensing roll 10 and the mating roll 11 measured in units of "time segments" can just as easily be considered in units of "circumferential segments." In the description of at least some embodiments of the present invention below, reference to "circumferential segments" is provided as an aid in understanding aspects of an example embodiment of the present invention. However, one of ordinary skill will recognize that "time segments" and mating roll periodicity could be utilized as well without departing from the scope of the present invention. The "circumferential segments" and "time segments" can also be referred to generically as "tracking segments"; this latter term encompassing both types of segments associated with the mating roll 11 and other periodic components as described below.

As mentioned above, data similar to that of FIGS. 4A and 4B is captured for each sensor 26 of the set 24. Thus, as each sensor 26 arrives at the region of the nip 12 and senses a pressure reading, a particular mating roll outer surface portion at an axial location corresponding to that sensor and at one of the 22 circumferential segments of the mating roll 11 will also be in the nip 12. Determining the mating roll segment that is in the nip 12 can be accomplished in a variety of different ways. One way involves indexing a particular one of the 22 mating roll segments with a trigger signal that is fired each time the mating roll 11 completes one revolution; a time period since the last trigger signal can be used to determine which of the 22 segments (measured relative to the indexed segment) is in the nip 12. For example, if the time between each firing of the trigger signal is 220 ms, then each time segment is 10.0 ms, which corresponds to one of the 22 mating roll circumferential segments. A pressure signal generated by a sensor 26 in the nip region occurring at 30 ms after the trigger signal would be assigned to time segment 3 as three 10.0 ms segments will have passed, e.g., the nip region, from when the trigger signal is made to when the pressure signal is generated.

Figure 5:
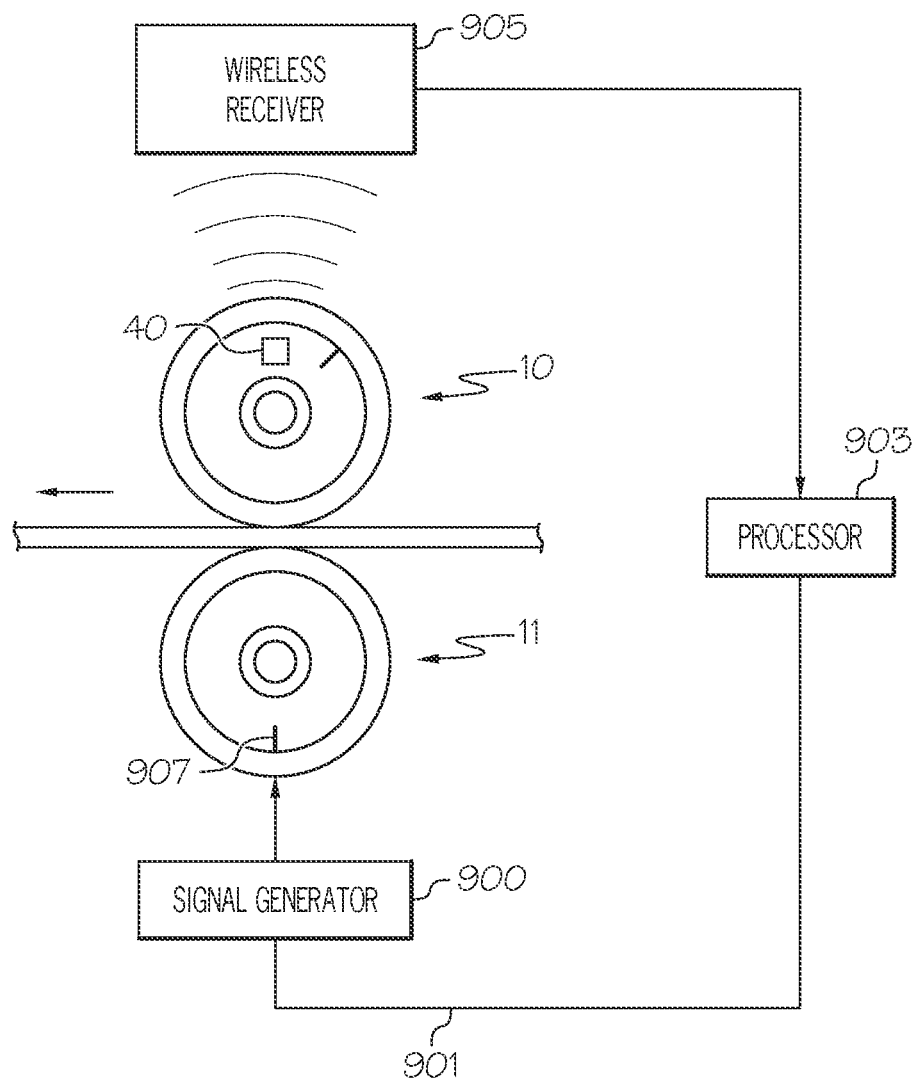
FIG. 5 is a schematic drawing showing the basic architecture of a particular monitoring system and paper processing line in accordance with the principles of the present invention.

In FIG. 5, a processor 903 can be present that can generate a real-time nip profile. In addition, the processor 903 can also receive a trigger signal 901 related to the rotation of the mating roll 11. As just described, some circumferential segment or position 907 of the mating roll 11 can be indexed or encoded such that a signal generator 900 detects the encoded segment 907 and generates the trigger signal 901 each time the signal generator 900 determines that the segment 907 of the mating roll 11 completes another full rotation. When the mating roll 11 is rotated such that the circumferential position or segment 907 is aligned with a detector portion of the signal generator 900, then the one of the 22 circumferential segments that happens to be positioned in the nip region can arbitrarily be labeled as the first circumferential segment such that the other circumferential segments can be numbered relative to this first segment. This particular rotational position of the mating roll 11 can be considered a reference position. As the mating roll 11 rotates, its rotational position will vary relative to that reference position and the amount of this variance determines which of the 22 circumferential segments will be positioned in the nip region. Accordingly, based on the rotational position of the mating roll 11 relative to that reference position a determination can be made as to which of the 22 circumferential segments is in the nip region when a particular sensor 26 generates a pressure signal. FIG. 5 illustrates the overall architecture of one particular system for monitoring paper production product quality. The system of FIG. 5 includes the processor 903, noted above, which defines a measurement and control system that evaluates and analyzes operation of the roll 11. The processor 903 comprises any device which receives input data, processes that data through computer instructions, and generates output data. Such a processor can be a hand-held device, laptop or notebook computer, desktop computer, microcomputer, digital signal processor (DSP), mainframe, server, other programmable computer devices, or any combination thereof. The processor 903 may also be implemented using programmable logic devices such as field programmable gate arrays (FPGAs) or, alternatively, realized as application specific integrated circuits (ASICs) or similar devices. The processor 903 may calculate and display the real-time average pressure profile calculated at the end of the prior collection session. For example, the pressure measurements from the sensors 26 can be sent to a wireless receiver 905 from transmitter(s) 40 located on the sensing roll 10. The signals can then be communicated to the processor 903. It is contemplated that the processor 903, in addition to calculating a real-time average pressure profile, may use the real-time average pressure profile to automatically adjust crown and loading mechanisms to achieve a flat pressure profile. Crown and loading mechanisms may also be adjusted manually by an operator using information provided by the real-time average pressure profile.

There are other ways to determine the position of the mating roll 11. One way is to use a high precision tachometer that divides the rotation of the roll 11 into a number of divisions, perhaps 440. In this example, each time segment would be 20 positions on the high precision tachometer. All methods of determining the position of the mating roll are included in this invention.

Figure 6:
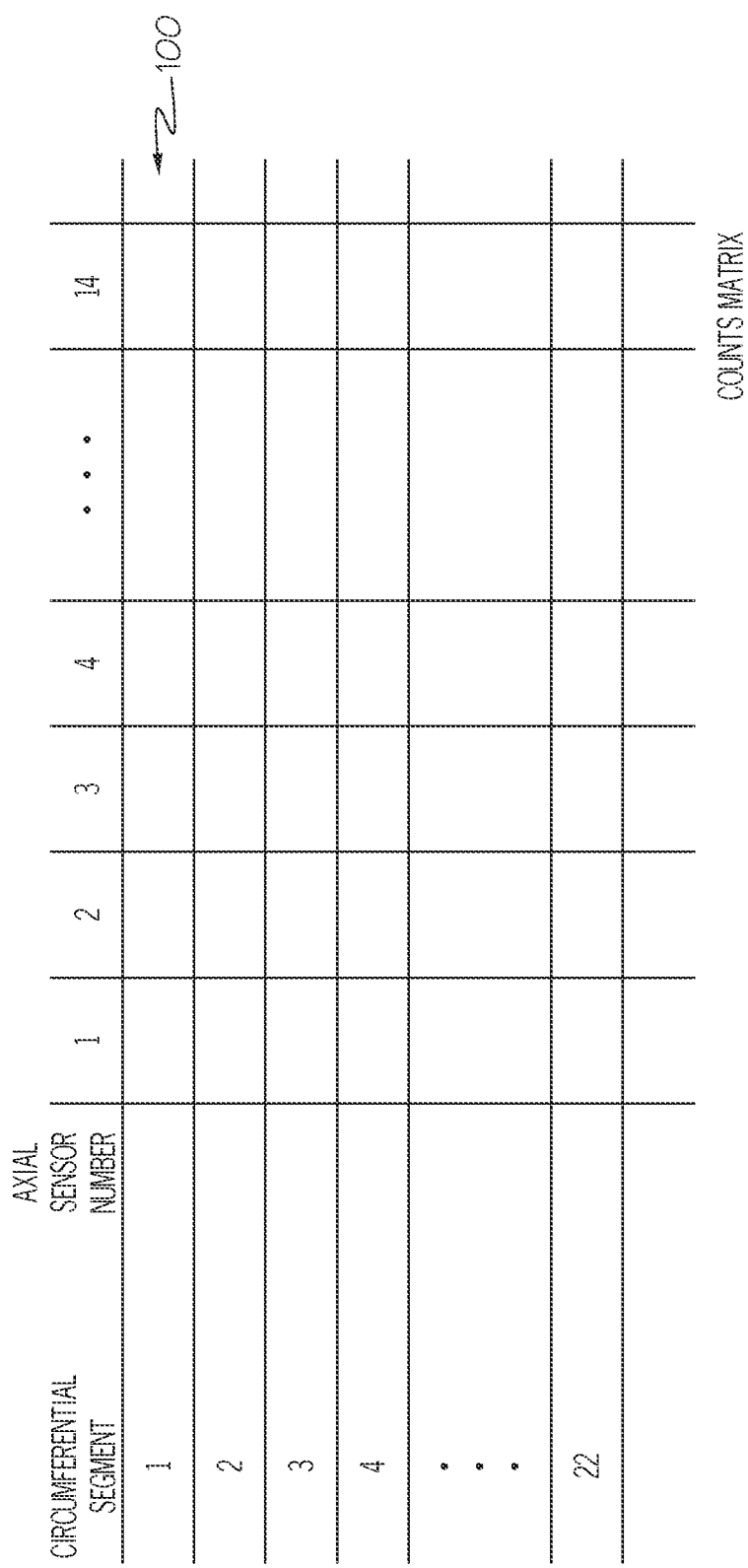
FIGS. 6, 7, and 8 depict matrices of different values that can be calculated for various axial segments and circumferential segments of a mating roll in accordance with the principles of the present invention.

In an example environment in which there are 14 axially arranged sensors 26, each of which can be uniquely referred to using an axial segment index value that ranges from "1" to "14", and there are 22 circumferential segments on the mating roll 11 (or time segments), each of which can be uniquely referred to using a tracking segment index value ranging from "1" to "22", there are 308 (i.e., 22×14=308) unique permutations of pairs consisting of a sensor number and a circumferential segment number (or time segment number), wherein each permutation is identifiable by a two-element set comprising a respective axial segment index value and a respective tracking segment index value. In the illustrated embodiment, the sensor numbers also correspond to the mating roll axial segments. Therefore the data collected can be considered a 22×14 matrix as depicted in FIG. 6. Each row of FIG. 6 represents one of the 22 mating roll circumferential segments (or time segments) and each column represents one of the 14 axially arranged sensors 26 and, thus, each cell represents one of the possible 308 permutations. Each column also corresponds to a mating roll outer surface portion at an axial location aligned with and corresponding to the sensor 26 assigned that column. Each cell represents a combination of a sensor number (or axial segment number) and a particular mating roll circumferential segment (or time segment). For example, cell 100 represents a value that will relate to a pressure reading that occurred when sensor number 14 (number 14 of the 1-14 sensors defining the set 24) entered the region of the nip 12 concurrently with a mating roll outer surface portion at an axial location corresponding to sensor number 14 and mating roll circumferential segment number 1 (or time segment number 1). Thus, each cell of the matrix represents a unique permutation from among all the possible permutations of different axial segment numbers (e.g., 1-14) and circumferential segment numbers (e.g., 1-22) (or time segments 1-22). A value stored in a particular matrix element is thereby associated with one particular permutation of possible axial segment numbers and circumferential segment numbers (or time segments).

Figure 7:

The matrix of FIG. 6 can, for example, be a "counts" matrix wherein each cell represents the number of times a particular sensor and a particular mating roll outer surface portion at an axial location corresponding to that sensor and a particular mating roll circumferential segment were concurrently in the region of the nip 12 to acquire a pressure reading value. FIG. 7 illustrates a similarly sized matrix (i.e., 22×14) but the values within the matrix cells are different from those of FIG. 6. The cell 200 still represents a value that is related to sensor number 14 (or axial segment 14, out of 1-14 axial segments, of the mating roll 11) and circumferential segment 1 but, in this example, the value is a cumulative total of pressure readings, e.g., in pounds/inch, acquired by the sensor for that circumferential segment during a plurality of rotations of the sensing roll 10. Thus, each time sensor number 14 happens to enter the region of the nip 12 along with the mating roll circumferential segment number 1, the acquired pressure reading value is summed with the contents already in the cell 200. Each of the 308 cells in this matrix of FIG. 7 is calculated in an analogous manner for their respective, associated sensors and segments.

Figure 8:
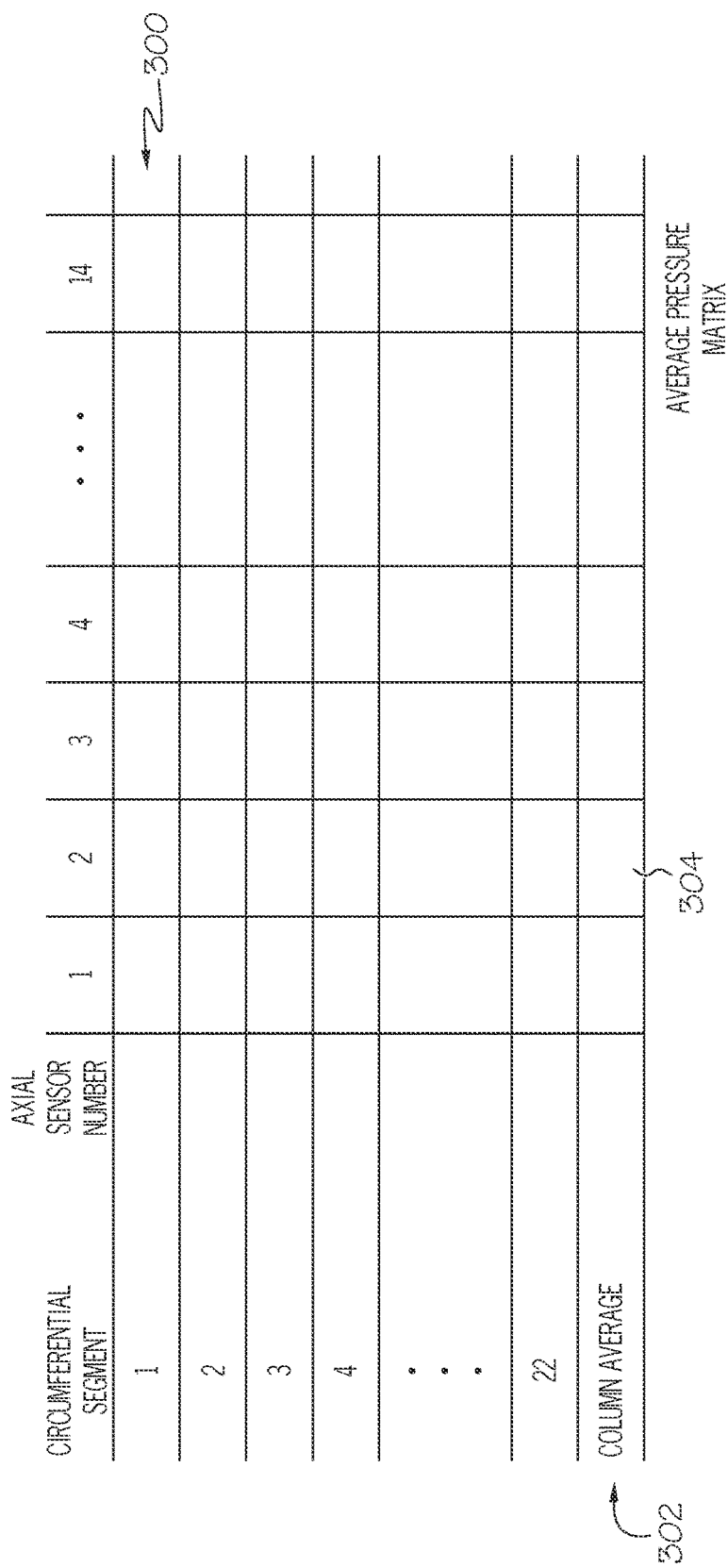

From the matrices of FIG. 6 and FIG. 7, an average pressure matrix depicted in FIG. 8 can be calculated. For example, cell 100 includes the number of pressure readings associated with sensor number 14 (or axial segment 14 of the mating roll 11) and circumferential segment number 1 while cell 200 includes the total or summation of all those pressure readings. Thus, dividing cell 200 by cell 100 provides an average pressure value for that particular permutation of sensor number and mating roll circumferential segment number which entered the region of the nip 12 concurrently.

As a result, the matrix of FIG. 8 represents an average pressure value that is sensed for each particular sensor number and mating roll circumferential segment number. The length of time such data is collected determines how many different pressure readings are used in such calculations.

The data set out in FIGS. 4A and 4B is simulated data.

The raw pressure readings, or pressure signals, from the sensors 26 can be affected by a variety of components in the system that move the web of material. In particular, the average values in the average pressure matrix of FIG. 8 are related to variability synchronized to the mating roll 11. However, there may be other variability components that are not synchronized with the mating roll 11 such as variability in a cross direction (CD), shown in FIG. 2. One measure of this CD variability is captured by calculating an average for each column of the average pressure matrix. Thus, the average pressure matrix of FIG. 8 can also include a row 302 that represents a column average value. Each of the 14 columns may have 22 cells that can be averaged together to calculate an average value for that column. For example, cell 304 would be the average value in the 22 cells of the second column of the average pressure matrix.

Individual collection sessions of pressure readings to fill the matrices of FIGS. 6, 7, and 8 may be too short to build robust and complete matrices due to data buffer and battery life limitations of data acquisition systems in communication with the sensing roll 10. In such cases, consecutive collection sessions can be combined by not zeroing the matrices (i.e., counts and summation matrices) upon starting a new collection session or combining the separate matrices collected in a post hoc fashion. Consequently, collections may be stopped and restarted without loss of data fidelity as long as the synchronization of the mating roll is maintained. In particular, combining multiple collection sessions that are separated by gaps in time can be beneficial to help populate the matrices. For example, if the period difference between the two rolls were closer to 2.001 instead of 1.0 time or circumferential segments, the collection would have a tendency to collect only evenly numbered time/circumferential segments in the short term (i.e., evenly numbered segments are those that are offset an even number of segments from a starting segment) until sufficient time has passed to move the collection into the odd numbered time/circumferential segments. Combining collection sessions separated by a long time delay may help to shift the collection so that data is more uniformly captured for all the different time/circumferential segments because there is no expectation that the period of the mating roll will be related to arbitrary time gaps between collection sessions.

Figure 9A:
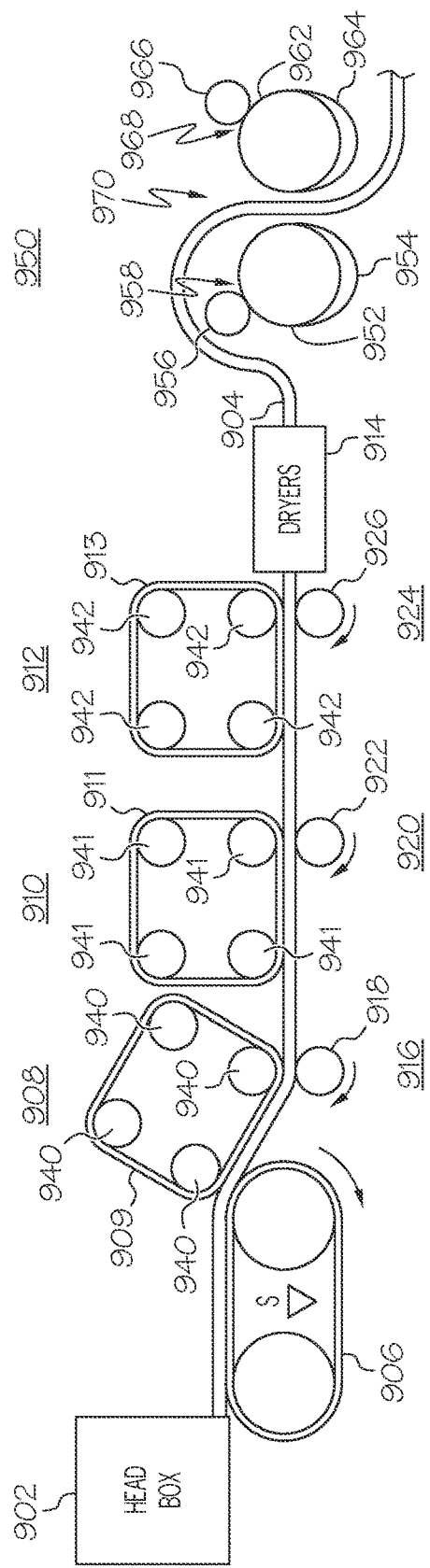
FIG. 9A illustrates an exemplary paper-making process or system configuration in accordance with the principles of the present invention in which each of the various circles represents a rotating component (e.g. a roll, felt, etc.) that help propels a web of material through the system or process.

The press of FIG. 1 can be located at a number of different positions within the chain or serial sequence of different components that are part of a modern paper processing operation. FIG. 9A illustrates an exemplary process and system configuration in accordance with the principles of the present invention in which each of the various circles represents a rotating component (e.g. a roll) that helps propel a web of material 904 through the process/system. The process starts at a headbox 902 where a fiber slurry is distributed over a wire mesh 906 which allows liquid to readily drain from the slurry. From the wire mesh 906, the web of material 904 travels to a first wet felt station 908 having a felt 909 that helps dry the web of material 904. The felt 909 is a continuous band arranged to travel in a loop pattern around a plurality of rolls 940. In the example of FIG. 9A, there are four rolls 940. The felt 909 enters a press area 916 between one of the rolls 940 and a sensing roll 918. The sensing roll 918 may operate similar to the sensing roll 10 of FIG. 1. Downstream from the wet felt station 908 is another wet felt station 910 having its own felt 911 traveling in a loop pattern around another set of four rolls 941. There is also a second press region 920 having a press roll 922, which, in the illustrated embodiment, is not a sensing roll. The last wet felt station 912 has a felt 913 traveling in a loop pattern around another set of four rolls 942. The felt 913 is pressed by one of the rolls 942 and a second sensing roll 926 in a third press region 924. The felts 909, 911, 913 are pressed into the web of material in their respective press regions 916, 920, 924 to absorb liquid from the web of material 904. In this manner, the web of material 904 is drier after passing through the wet felt stations 908, 910, 912. By "drier" it is meant that the fibers in the web of material 904 have a higher percentage by weight of fibers after the wet felt stations than before. Additional drying can be performed, however, by separate dryers 914 before the web of material 904 progresses further downstream in the process of FIG. 9A.

The process or system of FIG. 9A includes an application or coating station 950 where application material can be applied to one or both sides of the web of material 904. In the illustrated example of FIG. 9A, the application station 950 affects both sides of the web of material 904. On the left side, a first applicator roll 952 travels through a trough 954 which holds a first application material that adheres to a cover of the applicator roll 952. The first applicator roll 952 and a first applicator rod 956 form a nip 958 that changes a thickness of the first application material that is on the cover of the applicator roll 952. The first applicator roll 952 defines a nip 970 with a second applicator roll 962. On the right side, the second applicator roll 962 travels through a trough 964 which holds a second application material (which may or may not be different than the first material in the trough 954) that adheres to a cover of the second applicator roll 962. The second roll 962 and a second applicator rod 966 form a nip 968 that changes a thickness of the second application material that is on the cover of the roll 962. When the first and second application materials on the first and second rolls 952 and 962 enter the nip 970, the first and second applicator rolls 952 and 962 press the first and second application materials into the web of material 904. The first and second application materials may comprise a conventional liquid paper surface sizing composition. Also, one or both of the first and second application materials can comprise conventional coating compositions. Example application materials are disclosed in U.S. Pat. Nos. 7,018,708; 7,745,525; 8,361,573; 7,815,770; 7,608,166; 7,736,466; 7,967,953; 8,372,243; 8,758,565; 7,828,935; 7,608,338; 8,007,920; 8,586,279; 8,586,280; 8,574,690; 8,758,886; 8,382,946; 7,582,188; 8,123,907; 8,652,593; 8,697,203; 8,652,594; 8,012,551; 8,440,053; 8,608,908; 8,795,796; and 8,586,156, the disclosures of which are incorporated herein by reference.

The applicator rods 956, 966 may be either size press rods or coating rods. A size press rod typically has spaced apart grooves with ridges between the grooves that touch the cover of the applicator roll into which the size press rod is pressed, with possibly a thin lubricating film between the ridges and the applicator roll. The grooves help distribute the application material (e.g., sizing composition) in a uniform manner across the cover of the roll. A coating rod typically will not contact the cover of the roll against which it is opposed; rather, the coating rod indirectly presses into the opposing roll by pressing onto the coating of application material that is on the cover of the roll. The coating rod helps to create a coating of application material on the roll that is of uniform thickness. As an example, a sizing composition can be applied to reduce the rate at which liquid will penetrate the ultimately produced paper product, see previously noted U.S. Pat. No. 8,382,946. A coating, for example, can include material that will produce a change in the texture and/or color of a product on the side to which it is applied. One of ordinary skill will recognize that various sizing and coating materials can be applied to one or both sides of the web of material 904 without departing from the scope of the present invention. Furthermore, one of ordinary skill will recognize that there are a variety of different specific ways to adhere a sizing composition or a coating material to a cover of a roll before being metered by a press rod or coating rod. Embodiments of the present invention contemplate utilizing any of these techniques without departing from the scope of the present invention.

Figure 9B:
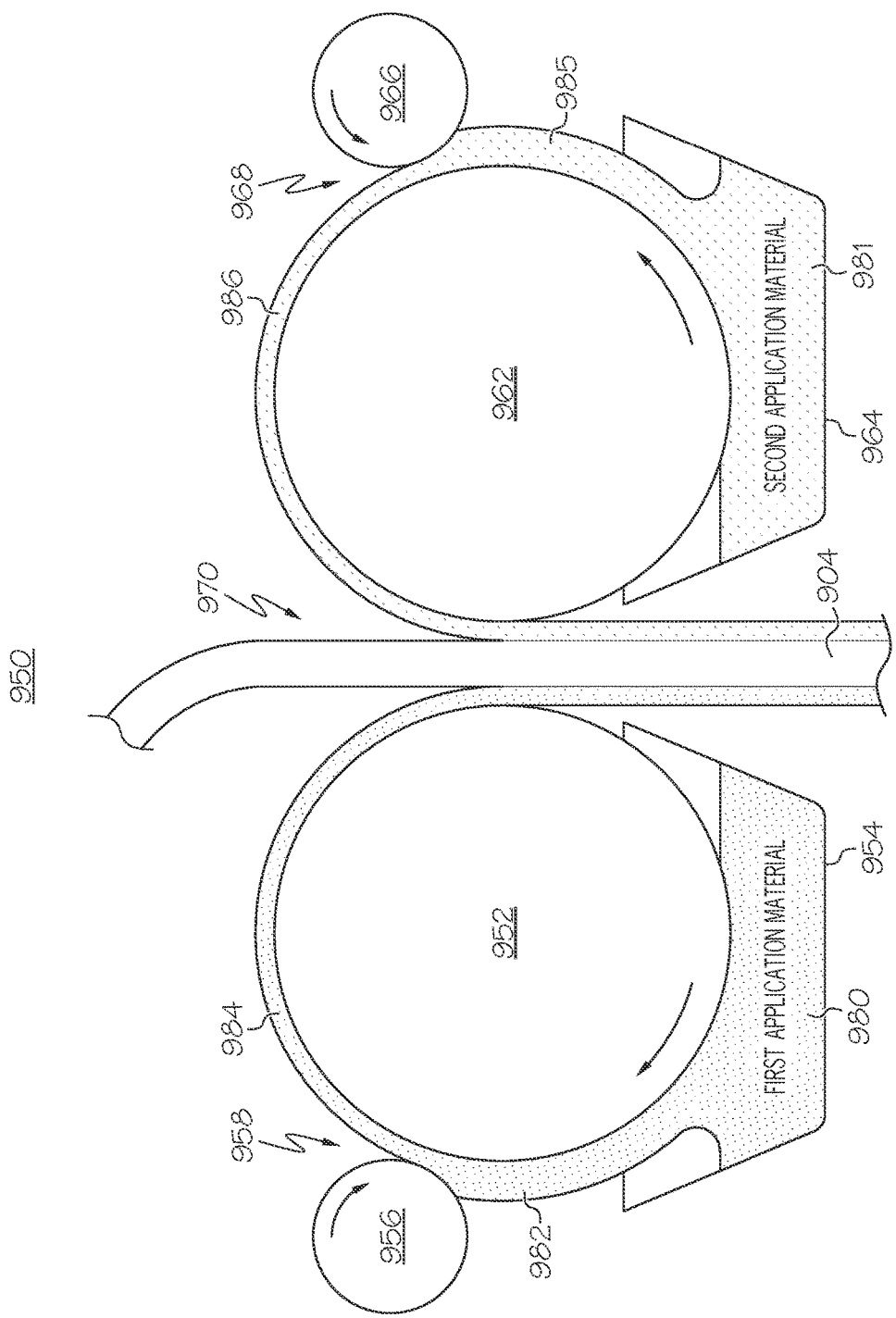
FIG. 9B illustrates an application station in accordance with the principles of the present invention.

FIG. 9B illustrates details of an application station in accordance with the principles of the present invention. The left-side first applicator roll 952 is described by way of example but the same features can be attributed to the right-side second applicator roll 962 as well. In the discussion below of many of the various aspects of the present invention, only a single side of the application station 950 may be described but it is intended that the description be applicable to both sides of the station 950.

The roll 952 rotates in a clockwise direction through a trough 954 of a first application material 980 that becomes a portion of first application material 982 that adheres to the first applicator roll 952 before encountering the first applicator rod 956. The first applicator rod 956 (e.g., coating rod or sizing rod) in this example rotates in a clockwise direction and forms the nip 958 with the first applicator roll 952. The first applicator rod 956 could also be configured to rotate in a counter-clockwise direction as well. As mentioned earlier, if the first applicator rod 956 is a size press rod, then it will have a grooved outer surface and have ridges that typically contact the outer surface of the first applicator roll 952. If the first applicator rod 956 is a coating rod with a smooth surface, then it is typically rides on top of the coating material 982 a small distance from the outside surface of the first applicator roll 952 such that it does not directly contact the outside surface of the first applicator roll 952. In the embodiment illustrated in FIG. 9B, the first applicator rod 956 is a coating rod. In this embodiment, the first applicator rod 956 helps to evenly distribute the material 982 in an axial direction and define with the first applicator roll 952 the nip 958 such that the first application material 984, after passing through the nip 958, has a substantially uniform thickness. The first applicator roll 952 continues to rotate so that the relatively uniform application material 984 enters the nip 970 defined between the first and second rolls 952 and 962. The rolls 952 and 962 are configured as a press station such that the material 984 that enters the nip 970 is pressed into the web of material 904. In FIG. 9B, the example application station 950 also includes a second applicator roll 962 that forms a nip 968 with a second applicator rod 966. Thus, a portion 985 of a second application material 981 can adhere to the second applicator roll 962 and be uniformly distributed by the second applicator rod 966 into a uniform coating 986 of the second application material that enters a region of the nip 970 to be pressed into the web of material 904.

Figure 10:
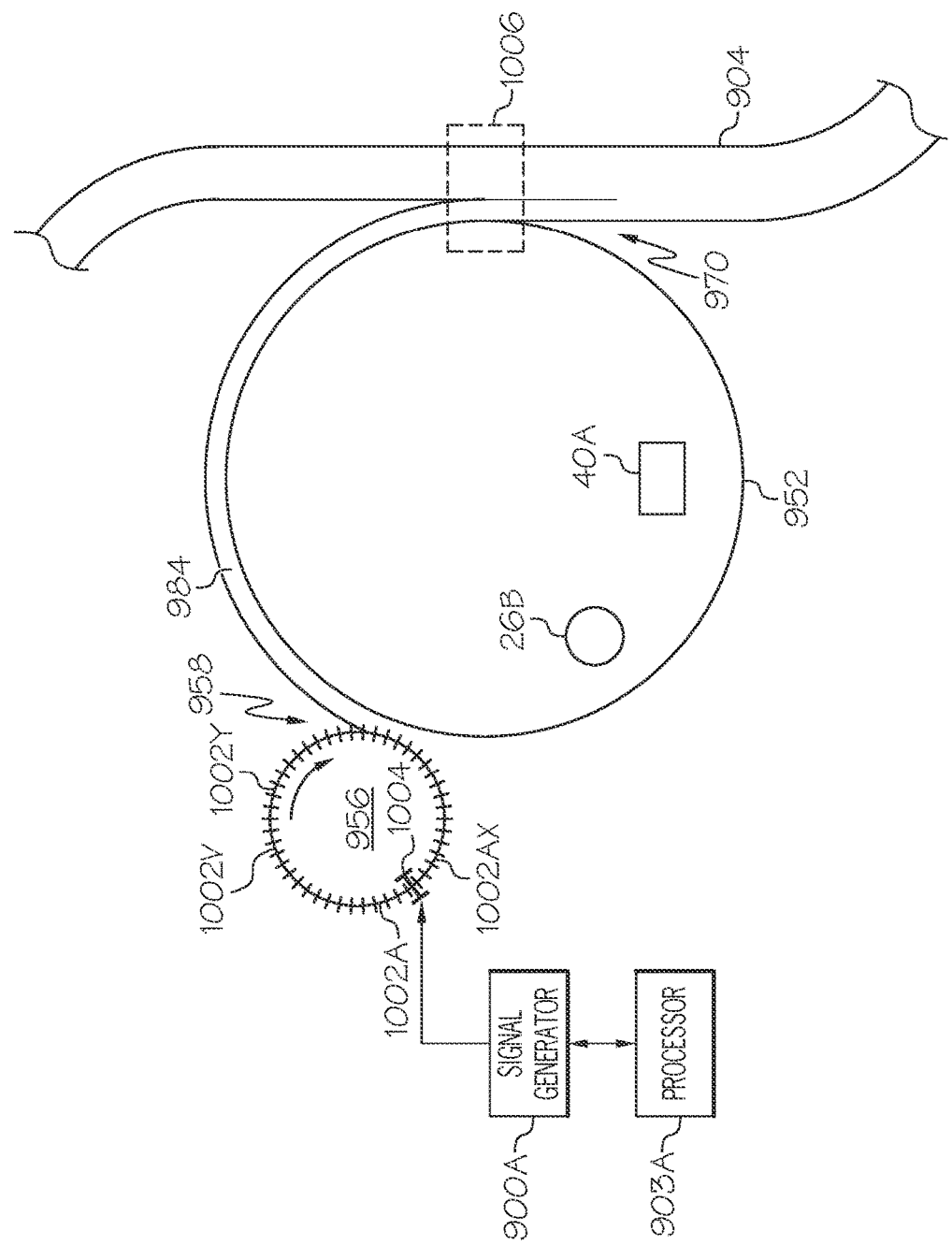

The first applicator roll 952 can be a sensing roll similar to the sensing roll 10 described above. The applicator roll 952, see FIG. 9C, may have 100 axially-spaced sensors 26B, for example, which correspond to 100 different axial segments 951 of the first applicator rod 956. As such, a plurality of sensors 26B can be arranged around the outside surface of the sensing roll 952 as shown in FIG. 9C. FIG. 9C and FIG. 10 illustrate details about the application station 950 of FIG. 9B. In particular, FIG. 9C depicts the rolls 952 and 962 along with the first applicator rod 956 from an overhead perspective. A hypothetical cross-sectional view of the nip 970 is also included in FIG. 9C to show the presence of the first application material 984, the web of material 904, and the second application material 986. In FIGS. 9B and 9C, the first applicator rod 956 is, by way of example, illustrated as a coating rod because it has a smooth, continuous outer surface 994 and defines with the first applicator roll 952 the nip 958 extending along or substantially along the entire length of the sensing roll 952. Because of the angle of view in FIG. 9C, it appears that the first applicator rod 956 and the first applicator roll 952 are in contact at the nip 958, however, as is shown in FIG. 9B, there is a layer of first application material 984 between the rod 956 and roll 952. In operation, pressure is applied (e.g., by a rod holder (not shown)) substantially uniformly along the length of the first applicator rod 956. If the first applicator rod 956 were, for example, a size press rod, or metering rod, then the ridges of that press rod would be substantially in contact with the sensing roll 952 along the entire length of the nip 958 and each of the grooves would define a distance between the press rod and the sensing roll 952. In either case, a surface of the first applicator rod 956 is beneficially a uniform distance from the outer surface of the first applicator (or sensing) roll 952 at the nip 958. In the illustrated embodiment, the first applicator roll 952 may comprise 100 sensors 26B spaced an equal distance apart axially.

In the earlier description of the mating roll 11, it was segmented into 14 axial segments to correspond to each of the sensors 26A of the sensing roll 10. Similarly, as mentioned above, the first applicator rod 956 can be segmented into 100 axial segments 951 that each correspond to one of the sensors 26B on the first applicator roll 952.

The first applicator rod 956, which, in an illustrated embodiment, may have a diameter 953 of about ⅝ inches as compared to a diameter of about 30 inches for the applicator roll 952, is typically driven by a first drive motor 990 on one end and a second drive motor 992 on another end that are synchronized to cause the first applicator rod 956 to uniformly rotate about its central axis and at a constant rotational speed. An application roll may typically rotate at about 3 rotations per second while an application rod may typically rotate at between about 60-90 rotations per minute. However, it is believed that unequal rotational forces imparted on the first applicator rod 956 by the drive motors may cause flexing and torsional responses that cause the distance from the surface of the first applicator rod 956 (e.g., the valleys, or grooves, of a press rod, or an outer surface of a coating rod) to be non-uniform along the length of the nip 958. Additionally, as sections of the first applicator rod 956 wear, some circumferential segments of the first applicator rod 956 can have different radial dimensions, as measured from the rod's central axis, when compared to other circumferential segments. As a result of these occurrences, the uniformity of the coating of material 984 may be imperfect and cause different amounts of material to be pressed into the web of material 904 thereby affecting the uniformity and quality of the ultimately produced paper product. Detecting operating conditions that may indicate that non-uniformity of the coating of material 984 is occurring may be beneficial in improving the operation of application stations such as station 950.

For example, in axial locations of the nip 958 where the first applicator rod 956 may "lift" away from the first applicator roll 952, resulting in more application material being present at corresponding axial locations or regions of the nip 958 than at other locations of the nip 958, a lower pressure reading may result at those axial locations where the rod lifted away than if no "lifting" had occurred. Conversely, in axial locations of the nip 970 where more application material is present than at other nip locations, the extra material will result in a higher pressure reading than if no extra material had been present. If the presence of application material at an axial location of the nip 970 is considered to be indicative of the moisture content of the web of material at a corresponding region or portion of the web of material having a corresponding axial location, then a pressure reading sensed at the axial location of the nip 970 is correlated with the moisture content of the corresponding web of material portion having a corresponding axial and circumferential location. In other words, portions of the web of material 904 that have a higher moisture content will cause a higher pressure reading. However, with respect to pressure readings sensed at different locations of the nip 958, pressure readings and the presence of more application material are inversely correlated such that lower pressure readings occur at an axial location where more application material is present.

This variation in pressure readings can be used to identify that a problem may exist with the interaction of the first applicator rod 956 and the first applicator roll 952. As a result, an operator may replace the first applicator rod 956 with a larger size rod or may change the rotational speed of the first applicator rod 956. Other possible corrective actions could include analyzing the synchronization between the drive motors 990, 992 or adjusting the holder (not shown) which presses the first applicator rod 956 against the first applicator roll 952.

As will be discussed further below, pressure readings taken at the region of the nip 958 at which the coating of material 984 is applied to the first applicator roll 952 or in the region of the nip 970 defined by the first and second applicator rolls 952 and 962 through which the coating of material 984 is applied to a web of material 904, for example, may be used to determine the uniformity of the coating of material 984 on the surface of the roll 952. The coating of material 984 is pressed into the web of material 904 at an area 1006 of the nip 970, see FIG. 10.

It is also noted that pressure readings taken by pressure sensors associated with the second applicator roll 962 taken at the region of the nip 968 defined by the second roll 962 and the second applicator rod 966 can be used to determine the uniformity of the second coating material 981 on the surface of the second roll 962.

FIG. 10 illustrates the first applicator rod 956 and the first applicator/sensing roll 952 arranged in alignment similar to the sensing roll 10 and the mating roll 11 of FIG. 1. The sensing roll 952 and the first applicator rod 956 form the nip 958 and each of the sensors 26B, 100 in the illustrated embodiment, at a corresponding axial section of the sensing roll 952 passes through a region of the nip 958 once each rotation of the sensing roll 952. On the first applicator rod 956, an indexed or encoded location 1004 is positioned such that each time it is adjacent a signal generator 900A it produces a time reference signal that is communicated to a processor 903A. Accordingly, upon each rotation of the first applicator rod 956, a new time reference signal will be generated. Also, a wireless transceiver 40A can be included on the first applicator/sensing roll 952 to communicate sensor reading information to the processor 903A. The first applicator rod 956 has a circumference that can be broken into 50 circumferential segments 1002A-1002AX (in FIG. 10 only 4 such segments are explicitly labeled 1002A, 1002V, 1002Y, 1002AX).

Thus, as shown in FIG. 10, the processor 903A can be present that can generate a real-time nip profile. In addition, the processor 903A can also receive a trigger signal defined by the time reference signal related to the rotation of the first applicator rod 956. As just described, some circumferential segment or position 1004 of the first applicator rod 956 can be indexed or encoded such that the signal generator 900A detects the encoded segment 1004 and generates the trigger or time reference signal each time the signal generator 900A determines that the segment 1004 of the first applicator rod 956 completes another full rotation. When the first applicator rod 956 is rotated such that the circumferential position or segment 1004 is aligned with a detector portion of the signal generator 900A, then the one of the 50 circumferential segments 1002A-1002AX that happens to be positioned in the region of the nip 958 can arbitrarily be labeled as the first circumferential segment such that the other circumferential segments can be numbered relative to this first segment. This particular rotational position of the first applicator rod 956 can be considered a reference position. As the first applicator rod 956 rotates, its rotational position will vary relative to that reference position and the amount of this variance determines which of the 50 circumferential segments 1002A-1002AX will be positioned in the nip region. Accordingly, based on the rotational position of the first applicator rod 956 relative to that reference position a determination can be made as to which of the 50 circumferential segments 1002A-1002AX is in the nip region when a particular sensor 26B generates a pressure signal.

As described with respect to the mating roll 11 and sensing roll 10, each sensor reading value from each of the sensors 26B on the first applicator/sensing roll 952 as it is in the region of the nip 958 can be associated with one of the plurality of circumferential segments 1002A-1002AX that is also concurrently in the region of the nip 958. These pressure reading values for all sensors at all of the axial segments of the first applicator/sensing roll 952 can be collected over a period of time to build a nip profile for the nip 958.

In an example environment in which there are 100 axially arranged sensors 26B on the first applicator/sensing roll 952, each of which can be uniquely referred to using an axial segment index value that ranges from "1" to "100", and there are 50 circumferential segments on the first applicator rod 956 (or time segments), each of which can be uniquely referred to using a tracking segment index value ranging from "1" to "50", there are 5,000 (i.e., 50×100=5,000) unique permutations of pairs consisting of a sensor number and a circumferential segment number (or time segment number), wherein each permutation is identifiable by a two-element set comprising a respective axial segment index value and a respective tracking segment index value. In the illustrated embodiment, the sensor numbers also correspond to the press rod axial segments 951. Therefore, the data collected can be considered a 50×100 matrix similar to that depicted in FIG. 6. Each row of the 50×100 matrix represents one of the 50 applicator rod circumferential segments (or time segments) and each column represents one of the 100 axially arranged sensors 26B and, thus, each cell represents one of the possible 5,000 permutations. Since the sensor numbers correspond to the applicator rod axial segments 951, each column also corresponds to an applicator rod axial segment, i.e., an outer surface portion of the applicator rod at an axial location aligned with and corresponding to the sensor 26B assigned that column. Each cell represents a combination of a sensor number (or axial segment number) and a particular applicator rod circumferential segment (or time segment). Thus, each cell of a matrix similar to that of FIG. 6 represents a unique permutation from among all the possible permutations of different axial segment numbers (e.g., 1-100) and circumferential segment numbers (e.g., 1-50) (or time segments 1-50). A value stored in a particular matrix element is thereby associated with one particular permutation of possible axial segment numbers and circumferential segment numbers (or time segments). The matrix similar to the one of FIG. 6 can, for example, be a "counts" matrix wherein each cell represents the number of times a particular sensor and a particular applicator rod outer surface portion at an axial location corresponding to that sensor and a particular rod circumferential segment were concurrently in the region of the nip 958 to acquire a pressure reading value.

Thus, similar to how a "sums" matrix of FIG. 7 and an "average" matrix of FIG. 8 were calculated, similar matrices could be calculated using the data collected from the first applicator/sensing roll 952 and the applicator rod 956 regarding the nip 958. The "average" matrix provides data that could reveal a periodically occurring pressure increase or decrease at one or more of the rod tracking segments for a rod axial segment as compared to other axial segments or as compared to other rod tracking segments for that particular rod axial segment. The occurrence of such a pressure variance could be indicative of an operational issue with the first applicator rod 956.

Similarly, a "counts" matrix, "sums" matrix and "average" matrix could be calculated using data collected from the first applicator/sensing roll 952 and the second applicator roll 962 regarding the nip 970, with such data being time synchronized to a period of rotation of the first applicator rod 956. Again, this "average" matrix also provides data that could reveal a periodically occurring pressure increase or decrease at one or more of the rod tracking segments for a rod axial segment as compared to other rod axial segments or as compared to other rod tracking segments for that particular rod axial segment. The occurrence of such a pressure variance could be indicative of an operational issue with the first applicator rod 956.

As a result, one matrix can be generated that represents an average pressure value, at the nip 958, that is sensed for each particular sensor number and press rod circumferential segment number or press rod time-based tracking segment. Alternatively, or in addition, a second matrix can be generated that represents an average pressure value, at the nip 970, that is sensed for each particular sensor number and tracking segment number of the press rod. The length of time such data is collected determines how many different pressure readings are used in such calculations.

Thus, pressure readings at the nip 970 can be time synchronized with one or more of the second applicator/sensing roll 962, the first applicator rod 956, or the second applicator rod 966. Pressure readings at the nip 958 can be time synchronized with the first applicator rod 956 and pressure readings at the nip 968 can be time synchronized with the second applicator rod 966. For example, the embodiment described with respect to FIG. 10 happens to have the first applicator/sensing roll 952 and the first applicator rod 956 define the nip 958. However, referring back to FIG. 9B, there is also a second applicator rod 966 which does not form a nip with the first applicator/sensing roll 952. Instead, the second applicator rod 966 forms a nip 968 with the second applicator roll 962. This second applicator roll 962 may also be a sensing roll or it may be a mating roll instead without pressure sensors. Pressure readings at various axial regions of the nip 970 are still influenced by the second applicator rod 966 that is involved with applying the second application material portion 986 to the second applicator roll 962. Thus, even though the second applicator rod 966 and the first applicator/sensing roll 952 do not form a nip with one another, pressure readings at the nip 970 sensed by the first applicator/sensing roll 952 can still be time-synchronized with a rotational period of the second applicator rod 966 using the techniques described above. Hence, variations in pressure readings taken at the nip 970 by the sensors of the first sensing roll 952 can be used to identify a problem that may exist with the interaction of the second applicator rod 966 and the second applicator roll 962.

FIGS. 11A1-12B illustrate a simulated data set representing collecting and averaging pressure readings at the nips 958, 970 at a plurality of distinct axial locations in a manner that is time-synchronized with a period of rotation of the first applicator rod 956. Continuing with the example embodiments described above, the first applicator rod 956 can have its period of rotation segmented into 50 tracking segments (see FIG. 10, 1002A-1002AX). These tracking segments could be either physical circumferential segments of the first applicator rod 956, as noted above, or correspond to time-based segments of a period of rotation of the first applicator rod 956. Additionally, the first applicator/sensing roll 952 can include 100 axially spaced-apart sensors 26B (as shown in FIG. 9C) that correspond to 100 axial segments of the first applicator rod 956. Each of the 100 axial segments 951 of the first applicator rod 956 also corresponds to a respective axial segment of the first applicator/sensing roll 952.

Accordingly, a 5,000 cell matrix can be constructed that has a cell for each permutation of a tracking segment number (e.g., 1-50) and an axial segment number (e.g., 1-100). Pressure reading values are sensed by each of the 100 sensors 26B in a region of the nip 958. For each pressure reading, one of the 50 tracking segments is identified based on the reference signal from signal generator 900A and the pressure reading value is associated with an appropriate cell of the 5,000 cell matrix. As explained above, data is collected for a period of time to capture a number of pressure readings for each cell so that an average pressure reading can be calculated for each cell.

As described above, these tracking segments could be either physical circumferential segments of the first applicator rod 956 or correspond to time-based segments of a period of rotation of the first applicator rod 956. When using time-based segments, some circumferential segment or position 1004 of the first applicator rod 956 can be indexed or encoded such that a signal generator 900A detects the encoded segment 1004 and generates a starting reference signal each time the signal generator 900A determines that the segment 1004 of the first applicator rod 956 completes another full rotation. When the first applicator rod 956 is rotated such that the circumferential position or segment 1004 is aligned with a detector portion of the signal generator 900A, the starting reference signal can be generated from which to measure, or index, the 50 sequentially occurring time segments into which the period of rotation of the first applicator rod 956 has been segmented. Thus, a first time segment starting concurrently with the generation of the starting reference signal can be considered a reference time-segment. As the first applicator rod 956 rotates, the number of time segments that have transpired since the occurrence of the reference time segment will depend on the amount of time that has transpired since generation of the reference starting signal. Accordingly, based on the number of time segments that have occurred between a pressure reading being sensed at a region of the nip 970 and the most recent starting reference signal, a determination can be made as to which of the 50 time-based tracking segment is to be associated with that pressure reading.

FIGS. 11A1-11A2 depict a simulated matrix of average pressure values for each cell of the 5,000 cell matrix collected at the nip 958 and time synchronized with the rotation of the first applicator rod 956. Each row 1102 corresponds to one of the tracking segments of the first applicator rod 956 and each column 1104 corresponds to one of the 100 sensors 26B (or equivalently, one of the 100 axial segments 951). Thus, each cell 1106 corresponds to a unique permutation of axial segment number and tracking segment number with the value of that cell providing an average pressure reading value at the nip 958 for that particular permutation of numbers. In FIGS. 11A1-11A2, the cell values happen to be measured in pounds per square inch (PSI) and for brevity, only the first 5 and last 5 of the 100 sensor locations are depicted.

The sensors 26B also rotate through the nip 970 and, thus, pressure readings can be collected that represent a pressure profile at the nip 970. These pressure readings are collected in a substantially similar manner as just described but are sensed at the nip 970 instead of (or in addition to) the nip 958.

Accordingly, an alternative, or additional, 5,000 cell matrix can be constructed that has a cell for each permutation of a tracking segment number (e.g., 1-50) and an axial segment number (e.g., 1-100). Pressure reading values are sensed by each of the 100 sensors 26B in a region of the nip 970. For each pressure reading, one of the 50 tracking segments is identified based on the reference signal from signal generator 900A and the pressure reading value is associated with an appropriate cell of the additional 5,000 cell matrix. As explained above, data is collected for a period of time to capture a number of pressure readings for each cell so that an average pressure reading can be calculated for each cell.

Unlike the behavior described above with respect to the mating roll and sensing roll of FIG. 3, the various pressures sensed at regions of the nip 970 are being collected such that they are synchronized with a rotating element that does not form or define the nip 970. In other words, the sensed pressure readings for each axial segment are synchronized with the period of rotation of the first applicator rod 956 which does not define the nip 970. More specifically, the period of rotation of the first applicator rod 956 can be segmented into a number of sequentially-occurring time segments that, for example, can be indexed based on generation of a reference signal such that the "first" time segment corresponds to when the reference signal is generated and the sequentially indexed time segments correspond to sequentially occurring time segments from when the reference signal was generated. Thus, at an axial location, as each particular pressure reading is sensed as a sensor at that axial segment enters a region of a nip, that pressure reading can be associated with one of the indexed time segments and, more particularly, the pressure reading can be associated with the specific time segment that is indexed by an amount of time that transpired from when the reference signal was generated and the sensor entered the region of the nip.

As a result, at an axial segment, there may be one particular circumferential segment of the first applicator rod 956 that is in a region of the nip 958 when a sensor, on the first applicator roll 952, at that same axial segment enters a region of the nip 970 and senses a pressure reading. Thus, when the sensor reading at a region of the nip 970 is sensed there happens to be a first portion of the first application material that is in the region of the nip 970 that affects the pressure reading and there also happens to be a second portion of the first application material 984 that is in contact with some physical circumferential segment of the first applicator rod 956. Even though the sensor reading at the region of the nip 970 will be associated with a particular one of the tracking segments that is a fraction of the period of rotation of the first applicator rod 956, that does not mean that the pressure reading is associated with the physical circumferential segment of the first applicator rod 956 that was previously in the region of the nip 958 and previously in contact with the first portion of the first application material 984.

FIGS. 11B1-11B2 depict a simulated matrix of average pressure values for each cell of the additional 5,000 cell matrix collected at the nip 970 and time synchronized with the rotation of the first applicator rod 956. Each row 1112 corresponds to one of the tracking segments of the first applicator rod 956 and each column 1114 corresponds to one of the 100 sensors 26B (or equivalently, one of the 100 axial segments 951). Thus, each cell 1116 corresponds to a unique permutation of an axial segment number and tracking segment number with the value of that cell providing an average pressure reading value at the nip 970 for that particular permutation of numbers. In FIGS. 11B1-11B2, the cell values happen to be measured in pounds per square inch (PSI) and for brevity, only the first 5 and last 5 of the 100 sensor locations are depicted.

Figure 12B:
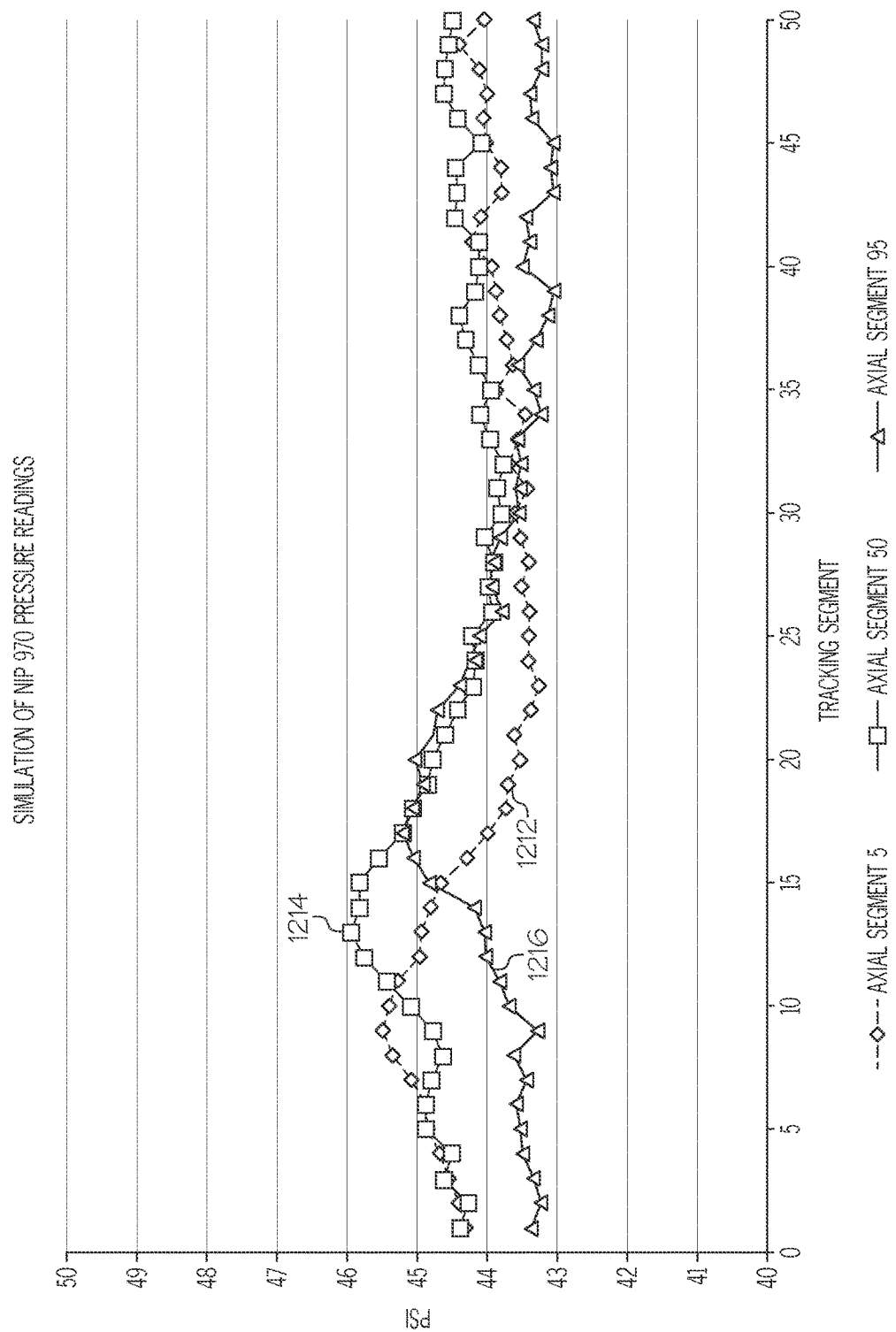

FIG. 12A depicts a portion of the simulated data of the matrix of FIGS. 11A1-11A2 but in a graphical manner. Similarly, FIG. 12B depicts a portion of the simulated data of the matrix of FIG. 11B1-11B2 but also in a graphical manner.

In FIG. 12A, 50 different average pressure values for three different axial segments are depicted. Graph 1202 represents the 50 different values (i.e., the rows of FIGS. 11A1-11A2) for the $5^{th}$ axial segment associated with the first applicator rod 956 (i.e., the $5^{th}$ column of FIGS. 11A1-11A2). Graph 1204 represents the 50 different values (i.e., the rows of FIGS. 11A1-11A2) for the $50^{th}$ axial segment associated with the first applicator rod 956 (not shown in FIGS. 11A1-11A2). Graph 1206 represents the 50 different values (i.e., the rows of FIGS. 11A1-11A2) for the $95^{th}$ axial segment associated with the first applicator rod 956 (i.e., the $95^{th}$ column of FIGS. 11A1-11A2). For example, the graph 1202 reveals that at axial segment 5 the pressure readings for the 50 different tracking segments tend to be between 7.5 PSI and 8.5 PSI but that around tracking segment 10, the pressure reading dips below 7.5 PSI. Such a dip may indicate that the first applicator rod 956 is periodically lifting away from the first applicator roll 956 in a region of the nip 958 corresponding to axial segment 5.

In FIG. 12B, 50 different average pressure values for three different axial segments are depicted. Graph 1212 represents the 50 different values (i.e., the rows of FIGS. 11B1-11B2) for the $5^{th}$ axial segment associated with the first applicator rod 956 (i.e., the $5^{th}$ column of FIGS. 11B1-11B2). Graph 1214 represents the 50 different values (i.e., the rows of FIGS. 11B1-11B2) for the $50^{th}$ axial segment associated with the first applicator rod 956 (not shown in FIGS. 11B1-11B2). Graph 1216 represents the 50 different values (i.e., the rows of FIGS. 11B1-11B2) for the $95^{th}$ axial segment associated with the first applicator rod 956 (i.e., the $95^{th}$ column of FIGS. 11B1-11B2). The relative magnitude of the pressure PSI readings in FIG. 12B as compared to FIG. 12A show that a pressure sensed in regions of the nip 970 can be around 5 times greater than the pressure readings sensed at regions of the nip 958. Also, as one example, the graph 1214 reveals that at axial segment 50 the pressure readings for the 50 tracking segments tend to be in a range of about 44 to 45 PSI. However, around tracking segment 12 or 13, the average pressure value extends upwards to about 46 PSI. A higher pressure such as this can indicate that periodically, more application material 984 is passing through the nip 970 as a result of some periodic phenomena occurring between the first applicator rod 956 and the first applicator roll 952 along the region of the nip 958 corresponding to axial segment 50.

Figure 13:
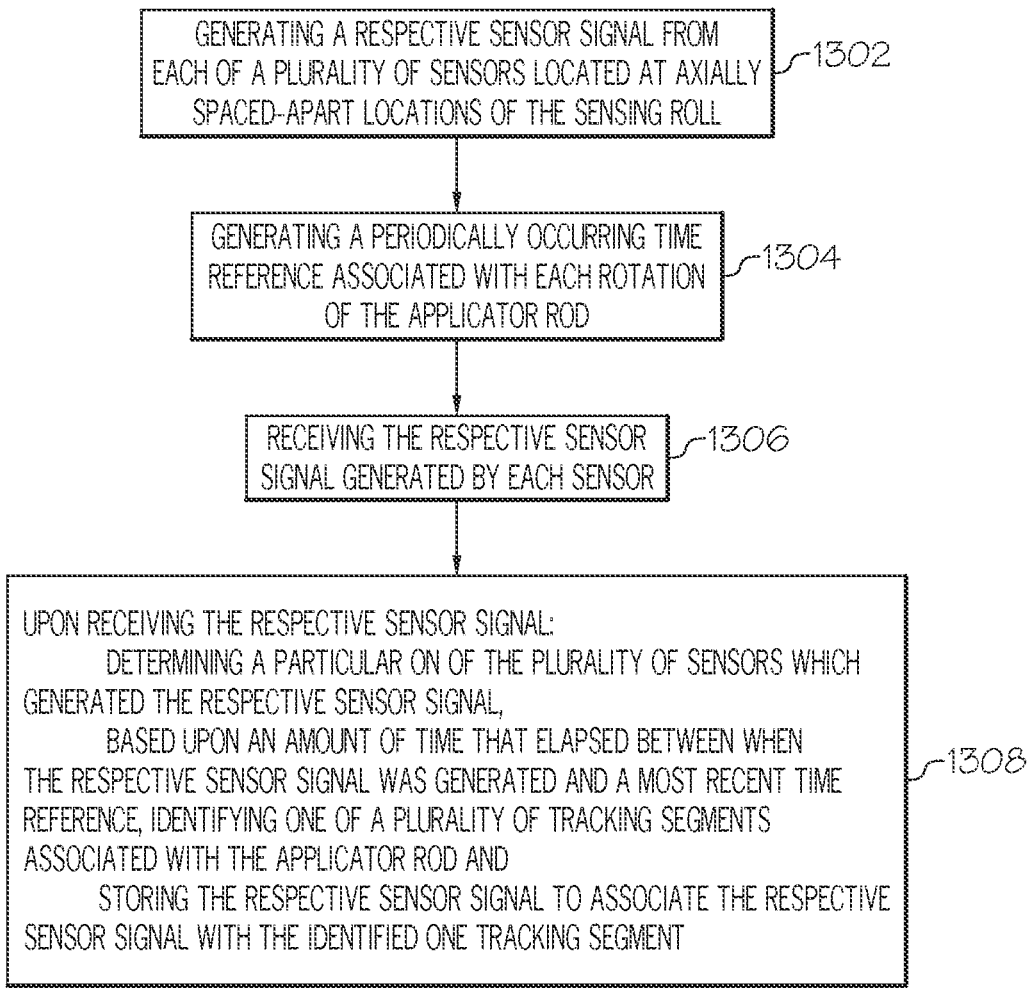
FIG. 13 is a flowchart of an exemplary method of time-synchronizing data in accordance with the principles of the present invention.

FIG. 13 is a flowchart of an exemplary method of time-synchronizing data in accordance with the principles of the present invention. The method begins in step 1302 by generating a respective sensor signal from each of a plurality of sensors located at axially spaced-apart locations of a sensing roll. More particularly, each respective sensor signal is generated when each sensor enters a region of a first nip between the sensing roll and a press rod or a region of a second nip between the sensing roll and a mating roll during each rotation of the sensing roll. For the sensing roll and mating roll, they are located relative to one another to create the second nip therebetween through which a web of material passes that travels through the second nip from an upstream direction to a downstream direction. For the sensing roll and the press rod, they form the first nip therebetween and are part of an application station that applies either a sizing composition or coating to the cover of the sensing roll so that it is eventually pressed into the web of material. The method continues in step 1304 by generating a periodically occurring time reference associated with each rotation of the press rod. Next, in accordance with the method, the respective sensor signal generated by each sensor is received in step 1306 whether that sensor signal occurs based on the sensor being in the region of one of the first or the second nips. In step 1308, upon receiving the respective sensor signal, the method involves three different actions: a) determining a particular one of the plurality of sensors which generated the respective sensor signal, b) identifying one of a plurality of tracking segments associated with the press rod based upon an amount of time that elapsed between when the respective sensor signal was generated and a most recent time reference, and c) storing the respective sensor signal to associate the respective sensor signal with the identified one tracking segment. Of particular note, each of the plurality of tracking segments is, respectively, associated with a different amount of elapsed time. In accordance with the method of FIG. 13, the press rod can comprise either a size press rod or a coating rod.

In addition to the time-based techniques described above for identifying different tracking segments associated with an applicator rod, alternative techniques are contemplated as well. For example, an applicator rod could include multiple, evenly-spaced marks that could be detected (e.g., optically) and counted as each such mark passes a location of a sensor or detector. A reference mark could be provided and would be distinctive from all the other marks such that when the sensor detects the reference mark, the counter circuitry resets and starts counting from an initial value (e.g., "0" or "1"). As an example, each evenly-spaced mark could be a single tick mark, a tick mark of a particular width, or a mark of a particular color. The reference mark could be a double-tick mark, a thicker (or thinner) tick mark, or a mark of a unique color. The marks would function so as to separate the applicator rod into different segments and a counter, or similar circuitry, would increment a count each time a mark was detected so that any collected data could be associated with one of the segments of the applicator rod. Accordingly, there may be structure for generating a starting reference that includes a detector proximate to the surface of the applicator rod for detecting each of the plurality of marks traveling by the detector; and a signal generator in communication with the detector for generating the starting reference each time the distinctive reference mark is detected. Furthermore there may also be a counter in communication with the detector for counting a number of the plurality of marks that have been detected since the most recent starting reference, wherein a value related to an amount the applicator rod has rotated is equal to the number of the plurality of marks that have been detected since the most recent starting reference. Also, as an example, the generating of the starting reference can be accomplished by resetting the counter to an initial value (e.g., "0" or "1" as mentioned above). If the techniques of segmenting the applicator rod just described were utilized, then it would be unnecessary to explicitly measure an elapsed time since the most recent generation of a reference timing signal that is generated each revolution of the applicator rod; instead, detection and counting of tick marks could be used to define a plurality of count-based tracking segments. In addition to being on a surface of the applicator rod, the tick marks, or similar marks or openings, could be included on a shaft or as part of a coupling between a drive motor and the applicator rod, thereby providing a rotary encoder beneficial in identifying respective tracking segments. Such a "count-based" technique for synchronization of pressure data is more fully described in related patent application, application Ser. No. 14/735,892, entitled COUNT-BASED MONITORING MACHINE WIRES AND FELTS, filed Jun. 10, 2015, the disclosure of which is incorporated herein by reference in its entirety.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A system associated with a sensing roll for collecting roll data comprising:
    a plurality of sensors located at axially spaced-apart locations of the sensing roll, wherein each sensor enters a region of a first nip between the sensing roll and a rotating component during each rotation of the sensing roll;
    an application station, comprising a rotatable applicator rod forming a second nip with the sensing roll, wherein each sensor enters a region of the second nip between the sensing roll and the applicator rod during each rotation of the sensing roll;
    each sensor generates a respective sensor signal upon entering a region of the second nip;
    structure for generating a periodically occurring starting reference associated with each rotation of the applicator rod; and
    a processor to receive the periodically occurring starting reference and the respective sensor signal generated by each sensor as it moves through the second nip and, after receiving the respective sensor signal, the processor operates to:
        determine a particular one of the plurality of sensors which generated the respective sensor signal,
        based upon a value occurring between when the respective sensor signal was generated and a most recent starting reference, identify one of a plurality of tracking segments, wherein each of the plurality of tracking segments is, respectively, associated with a different value, and
        store the respective sensor signal to associate the respective sensor signal with the identified one tracking segment.

2. The system of claim 1, wherein the rotating component comprises a mating roll, a web of material travels through the first nip from an upstream direction to a downstream direction.

3. The system of claim 1, wherein:
    the starting reference comprises a time reference;
    the value occurring between when the respective sensor signal was generated and the most recent starting reference is calculated from an amount of time that has elapsed between when the respective sensor signal was generated and a most recent time reference; and
    each of the plurality of tracking segments is, respectively, associated with a different amount of elapsed time.

4. The system of claim 1, wherein the respective sensor signal comprises a pressure value.

5. The system of claim 1, wherein the plurality of tracking segments comprise one of:
    a plurality of circumferential segments on the applicator rod, and
    a plurality of time segments of a period of rotation of the applicator rod.

6. The system of claim 5, wherein the processor receives:
    the respective sensor signal for each of the plurality of sensors during each rotation of the sensing roll, and
    a plurality of the respective sensor signals occurring during a plurality of rotations of the sensing roll.

7. The system of claim 6, wherein, for each one of the plurality of the respective sensor signals, the processor identifies its identified one tracking segment and an associated applicator rod axial segment.

8. The system of claim 7, wherein:
    the applicator rod comprises n axial segments, having respective index values: 1, 2, . . . , n;
    an applicator rod rotational period comprises m tracking segments, having respective index values: 1, 2, . . . , m, and
    wherein there are (n times m) unique permutations that are identifiable by a two-element set comprising a respective axial segment index value and a respective tracking segment index value.

9. The system of claim 8, wherein, for the plurality of respective sensor signals and for one or more of the possible (n times m) permutations, the processor determines an average of all the plurality of respective sensor signals associated with an axial segment and tracking segment matching each of the one or more permutations.

10. The system of claim 1, wherein
    the applicator rod comprises a plurality of optically detectable marks along at least a portion of a surface of the applicator rod, wherein one distinctive mark of the plurality of optically detectable marks is different than all of the other marks.

11. The system of claim 10, wherein the structure for generating the starting reference comprises:
    a detector proximate to the surface of the applicator rod for detecting each of the plurality of optically detectable marks traveling by the detector; and
    a signal generator in communication with the detector for generating the starting reference each time the one distinctive mark is detected.

12. The system of claim 11, further comprising:
    a counter in communication with the detector for counting a number of the plurality of marks that have been detected since the most recent starting reference,
    wherein the value occurring between when the respective sensor signal was generated and the most recent starting reference is equal to the number of the plurality of marks that have been detected since the most recent starting reference.

13. The system of claim 12, wherein generating the starting reference comprises resetting the counter to an initial value.

14. The system of claim 1, wherein the applicator rod comprises one of a size press rod and a coating rod.

15. A method associated with a sensing roll for collecting roll data comprising:
    providing a plurality of sensors located at axially spaced-apart locations of the sensing roll, wherein each sensor enters a region of a first nip between the sensing roll and a rotating component during each rotation of the sensing roll;

providing an application station, having a rotating applicator rod with an axis of rotation substantially parallel to that of the sensing roll and forming a second nip with the sensing roll such that each sensor enters a region of the second nip during each rotation of the sensing roll;

each sensor generates a respective sensor signal upon entering a region of the second nip;

generating a periodically occurring starting reference associated with each rotation of the applicator rod; and receiving the periodically occurring starting reference and the respective sensor signal generated by each sensor and, after receiving the respective sensor signal:

determining a particular one of the plurality of sensors which generated the respective sensor signal, based upon a value occurring between when the respective sensor signal was generated and a most recent starting reference, identifying one of a plurality of tracking segments, wherein each of the plurality of tracking segments is, respectively, associated with a different value, and storing the respective sensor signal to associate the respective sensor signal with the identified one tracking segment.

16. The method of claim 15, wherein the rotating component comprises a mating roll, a web of material travels through the first nip from an upstream direction to a downstream direction.

17. The method of claim 15, wherein the respective sensor signal comprises a pressure value.

18. The method of claim 15, wherein the plurality of tracking segments comprise one of:

a plurality of circumferential segments on the applicator rod, and a plurality of time segments of a period of rotation of the applicator rod.

19. The method of claim 18, comprising:

receiving the respective sensor signal for each of the plurality of sensors during each rotation of the sensing roll, and receiving a plurality of the respective sensor signals occurring during a plurality of rotations of the sensing roll.

20. The method of claim 19, comprising:

for each one of the plurality of the respective sensor signals, identifying its identified one tracking segment and an associated applicator rod axial segment.

21. The method of claim 20, wherein:

the applicator rod comprises n axial segments, having respective index values: 1, 2, . . . , n;

an applicator rod rotational period comprises m tracking segments, having respective index values: 1, 2, . . . , m, and wherein there are (n times m) unique permutations that are identifiable by a two-element set comprising a respective axial segment index value and a respective tracking segment index value.

22. The method of claim 21, comprising:

for the plurality of respective sensor signals and for one or more of the possible (n times m) permutations, determining an average of all the plurality of respective sensor signals associated with an axial segment and tracking segment matching each of the one or more permutations.

23. The method of claim 15, wherein:

the starting reference comprises a time reference;

the value occurring between when the respective sensor signal was generated and the most recent starting reference is calculated from an amount of time that has elapsed between when the respective sensor signal was generated and a most recent time reference; and each of the plurality of tracking segments is, respectively, associated with a different amount of elapsed time.

24. The method of claim 15, wherein the applicator rod comprises a plurality of optically detectable marks along at least a portion of a surface of the applicator rod, wherein one distinctive mark of the plurality of optically detectable marks is different than all of the other marks.

25. The method of claim 24, comprising:

detecting, with a detector proximate to the surface of the applicator rod, each of the plurality of optically detectable marks traveling by the detector; and generating the starting reference each time the one distinctive mark is detected.

26. The method of claim 25, further comprising:

a counter in communication with the detector for counting a number of the plurality of marks that have been detected since the most recent starting reference, wherein the value occurring between when the respective sensor signal was generated and the most recent starting reference is equal to the number of the plurality of marks that have been detected since the most recent starting reference.

27. The method of claim 26, wherein generating the starting reference comprises resetting the counter to an initial value.

28. The method of claim 15, wherein the applicator rod comprises one of a size press rod and a coating rod.

* * * * *